US012596595B2

(12) United States Patent　(10) Patent No.:　US 12,596,595 B2
Felix et al.　(45) Date of Patent:　Apr. 7, 2026

(54) SUBSCRIPTION TO SYNC ZONES

(71) Applicant: Graphcore Limited, Bristol (GB)

(72) Inventors: Stephen Felix, Bristol (GB); Richard Osborne, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 904 days.

(21) Appl. No.: 17/811,684

(22) Filed: Jul. 11, 2022

(65) Prior Publication Data

US 2023/0016049 A1　Jan. 19, 2023

(30) Foreign Application Priority Data

Jul. 14, 2021　(GB) ...................................... 2110148
Jun. 30, 2022　(GB) ...................................... 2209635

(51) Int. Cl.
*G06F 9/46*　　　(2006.01)
*G06F 9/30*　　　(2018.01)
*G06F 9/52*　　　(2006.01)
*G06F 1/12*　　　(2006.01)

(52) U.S. Cl.
CPC .......... *G06F 9/522* (2013.01); *G06F 9/30087* (2013.01); *G06F 1/12* (2013.01)

(58) Field of Classification Search
CPC ......... G06F 9/522; G06F 9/30087; G06F 1/12
See application file for complete search history.

(56) References Cited

U.S. PATENT DOCUMENTS

2010/0289951 A1* 11/2010 Ryu ..................... H04N 21/242
　　　　　　　　　　　　　　　　　　　　348/E7.001
2019/0121784 A1　4/2019 Wilkinson 2020/0174851 A1* 6/2020 Manula ................... H04L 67/55
2020/0210365 A1* 7/2020 Wilkinson .......... G06F 9/30007
2021/0200601 A1　7/2021 Manula et al.
2021/0200602 A1　7/2021 Manula

FOREIGN PATENT DOCUMENTS

| JP | H04260962 A | 9/1992 |
| JP | 2010238003 A | 10/2010 |
| JP | 2011039666 A | 2/2011 |
| JP | 2019079526 A | 5/2019 |
| WO | 2019076715 A1 | 4/2019 |

OTHER PUBLICATIONS

Search Report and Written Opinion dated Nov. 9, 2022 for International Application No. PCT/EP2022/069053. 13 pages.
Office Action dated Apr. 1, 2025 for Japanese Patent Application No. 2024-501746.
Office Action dated Oct. 28, 2025 for Japanese Patent Application No. 2024-501695.

* cited by examiner

*Primary Examiner* — Tammy E Lee

(74) *Attorney, Agent, or Firm* — HAYNES AND BOONE, LLP

(57)　　　ABSTRACT

A set of configurable sync groupings (which may be referred to as sync zones) are defined. Any of the processors may belong to any of the sync zones. Each of the processor comprises a register indicating to which of the sync zones it belongs. If a processor does not belong to a sync zone, it continually asserts a sync request for that sync zone to the sync controller. If a processor does belong to a sync zone, it will only assert its sync request for that sync zone upon arriving at a synchronisation point for that sync zone indicated in its compiled code set.

25 Claims, 23 Drawing Sheets

Sync Ack

Sync signal from
execution unit

Control signal
based upon sync
zone register

Sync Request

Figure 20:
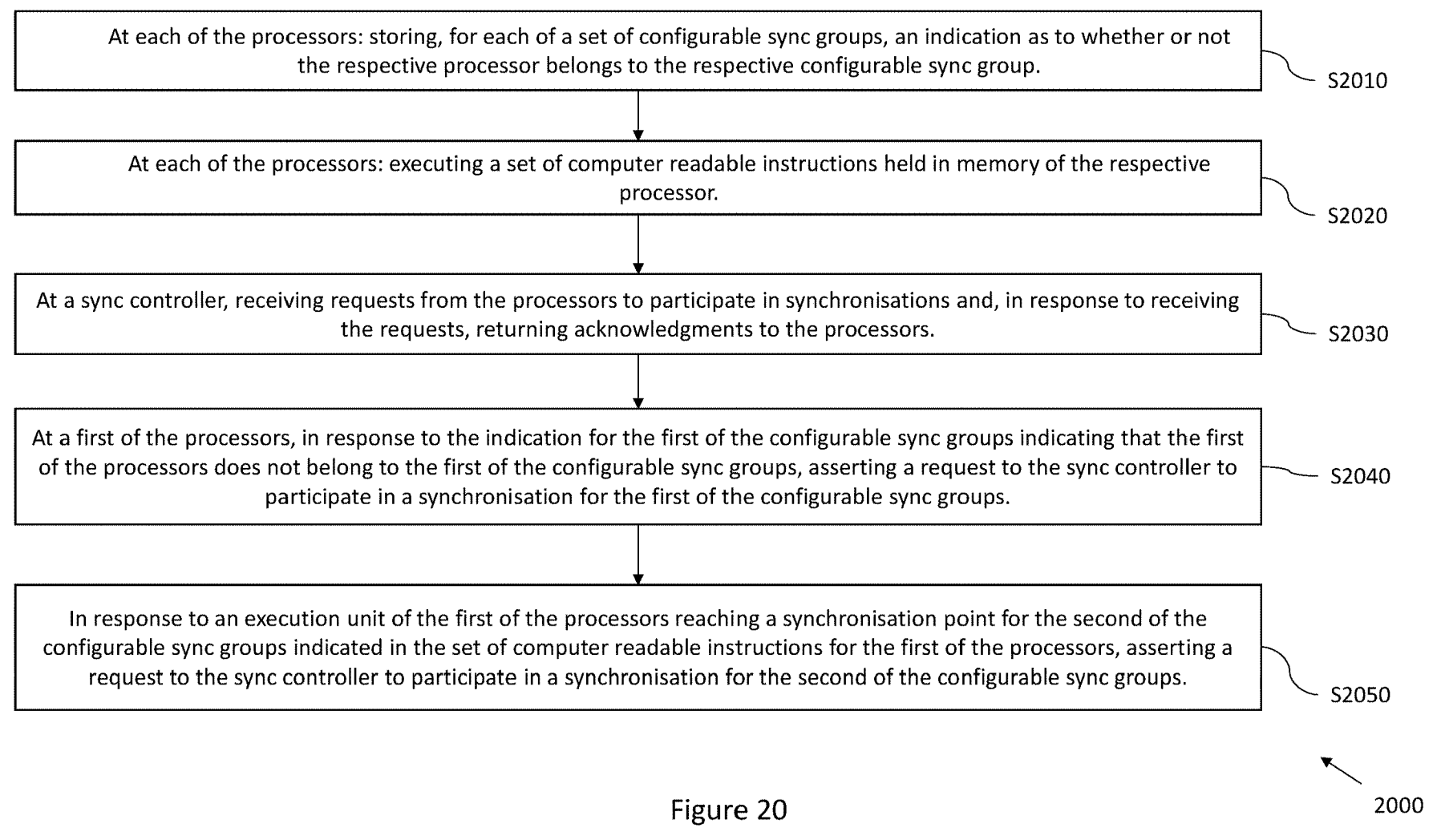

S2010

At each of the processors: storing, for each of a set of configurable sync groups, an indication as to whether or not the respective processor belongs to the respective configurable sync group.

S2020

At each of the processors: executing a set of computer readable instructions held in memory of the respective processor.

S2030

At a sync controller, receiving requests from the processors to participate in synchronisations and, in response to receiving the requests, returning acknowledgments to the processors.

S2040

At a first of the processors, in response to the indication for the first of the configurable sync groups indicating that the first of the processors does not belong to the first of the configurable sync groups, asserting a request to the sync controller to participate in a synchronisation for the first of the configurable sync groups.

S2050

In response to an execution unit of the first of the processors reaching a synchronisation point for the second of the configurable sync groups indicated in the set of computer readable instructions for the first of the processors, asserting a request to the sync controller to participate in a synchronisation for the second of the configurable sync groups.

SUBSCRIPTION TO SYNC ZONES

CROSS-REFERENCE TO RELATED APPLICATIONS

The present application claims priority to United Kingdom Patent Application No. GB2209635.8, filed Jun. 30, 2022, and United Kingdom Patent Application No. GB2110148.0 filed Jul. 14, 2021, the disclosures of which are hereby incorporated herein by reference in their entireties.

TECHNICAL FIELD

The present disclosure relates to a data processing device comprising a plurality of processors and in particular to the co-ordination of synchronisations involving ones of the plurality of processors.

BACKGROUND

In the context of processing data for complex or high-volume applications, a processing device for performing the processing of that data may be provided. The processing device may function as a work accelerator to which processing of certain data is offloaded from a host system. Such a processing unit may have specialised hardware for performing specific types of processing.

As an example, one area of computing in which such a specialised accelerator subsystem may be of use is found in machine intelligence. As will be familiar to those skilled in the art of machine intelligence, a machine intelligence algorithm is based around performing iterative updates to a "knowledge model", which can be represented by a graph of multiple interconnected nodes. The implementation of each node involves the processing of data, and the interconnections of the graph correspond to data to be exchanged between the nodes. Typically, at least some of the processing of each node can be carried out independently of some or all others of the nodes in the graph, and therefore large graphs expose great opportunities for multi-threading. Therefore, a processing device specialised for machine intelligence applications may comprise a large degree of multi-threading. One form of parallelism can be achieved by means of an arrangement of multiple processor tiles on the same chip (i.e. same die), each processor tile comprising its own separate respective execution unit and memory (including program memory and data memory). Thus separate portions of program code can be run in parallel on different ones of the tiles.

When a processing device comprising a plurality of processors operating in parallel is provided, a technique is required to prevent a piece of code running one processors from running ahead of data upon which it is dependent being made available by another piece of code running on another processor. There are a number of possible schemes for achieving this, one of which is described here by way of example, 'BSP', bulk synchronous parallel. According to BSP, each processing unit performs a compute phase and an exchange phase in an alternating cycle. During the compute phase each processing unit performs one or more computation tasks locally on processing unit, but does not communicate any results of its computations with any others of the processing units. In the exchange phase, each processing unit is allowed to exchange one or more results of the computations from the preceding compute phase to and/or from one or more others of the processing units. Further-more, according to the BSP principle, a barrier synchronization is placed at the juncture transitioning from the compute phase into the exchange phase, transitioning from the exchange phase into the compute phase, or both.

In order to co-ordinate synchronisations (e.g. barrier synchronisations) between processors, a central sync controller may be provided for receiving sync requests from each of a set of processors that are to sync together, and returning sync acknowledgments once sync requests have been received from all processors participating together in the synchronisation.

SUMMARY

In some cases, all of the processors belonging to a processing device may participate in a synchronisation. However, for some synchronisation points, it may be that some of the processors have no data to exchange with other processors. Therefore, it has been proposed to allow some processors of the processing device to operate asynchronously with other processors of the processing device. However, at a later time, two or more groups of processors, which may be behaving asynchronously with respect to one another, may be required to synchronise together at a synchronisation point. It is, therefore, desirable to provide a mechanism enabling different groupings of tiles to synchronise in a flexible manner.

According to a first aspect, there is provided a data processing device comprising: a plurality of processors; and a sync controller comprising circuitry configured to receive requests from the processors to participate in synchronisations and, in response to receiving the requests, return acknowledgments to the processors, wherein each of the processors comprises: an execution unit configured to execute a set of computer readable instructions held in memory of the respective processor; and a register storing, for each of a set of configurable sync groups, an indication as to whether or not the respective processor belongs to the respective configurable sync group, wherein for a first of the processors: the indication for a first of the configurable sync groups indicates that the first of the processors does not belong to the first of the configurable sync groups; and the indication for a second of the configurable sync groups indicates that the first of the processors does belong to the second of the configurable sync groups, wherein the first of the processors comprises circuitry configured to, in response to the indication for the first of the configurable sync groups indicating that the first of the processors does not belong to the first of the configurable sync groups, assert a request to the sync controller to participate in a synchronisation for the first of the configurable sync groups, wherein the circuitry of the first of the processors is configured to, in response to the execution unit of the first of the processors reaching a synchronisation point for the second of the configurable sync groups indicated in the set of computer readable instructions for the first of the processors, assert a request to the sync controller to participate in a synchronisation for the second of the configurable sync groups.

A set of configurable sync groupings (which may be referred to as sync zones) are defined. Any of the processors may belong to any of the sync zones. Each of the processor comprises a register indicating to which of the sync zones it belongs. If a processor does not belong to a sync zone, it continually asserts a sync request for that sync zone to the sync controller. If a processor does belong to a sync zone, it will only assert its sync request for that sync zone upon arriving at a synchronisation point for that sync zone indicated in its compiled code set. In this way, the sync controller, once all of the processors belong to a particular sync zone have reached the synchronisation point, will have received a sync request for that sync zone from all processors in the device (including those belonging to the zone and not belong to the zone), and can proceed to cause the sync acknowledgments to be sent to the processors of the device.

In some embodiments, the circuitry of the sync controller is configured to, in response to all of the processors of the data processing device issuing a request to participate in the synchronisation for the first of the configurable sync groups, issuing a corresponding acknowledgment to each of the processors.

In some embodiments, the circuitry of the sync controller is configured to: in response to the requests to participate in the synchronisation for the first of the configurable sync groups, issue a further request to an external sync controller for the processors to synchronise with further processors belong to further devices; and subsequently, in response to receipt of a further acknowledgment of the further request from the external sync controller, return to each of the processors, the corresponding acknowledgment to each of the processors.

In some embodiments, comprising the external sync controller, wherein the external sync controller comprises: storage storing a set of configuration settings for the first of the configurable sync groups; and circuitry configured to: in response to the further request received from the sync controller, exchange one or more additional requests and one or more additional acknowledgments with further devices in dependence upon the configuration settings for the first of the configurable sync groups.

In some embodiments, for each of the processors belonging to the first of the configurable sync groups, the execution unit of the respective processor is configured to, upon reaching a first barrier synchronisation enforced between the processors belonging to the first of the configurable sync groups, issue a request to participate in the synchronisation for the first of the configurable sync groups, wherein for the first of the processors, the respective execution unit is configured to, whilst the execution units of each of the processors belonging to the first of the configurable sync groups are paused waiting at the first synchronisation barrier, proceed with computation or data exchange without waiting at the first barrier synchronisation.

In some embodiments, the synchronisation for the second of the configurable sync groups is a second barrier synchronisation, wherein the execution unit of the first of the processors is configured to: in response to receipt of an acknowledgment to the request to participate in the synchronisation for the second of the configurable sync groups, proceed past the second barrier synchronisation.

In some embodiments, the execution unit of the first of the processors is configured to: proceed past the second barrier synchronisation by entering an exchange phase in which the first of the processors at least one of: sends or receives data.

In some embodiments, the execution unit of the first of the processors is configured to, following assertion of the request to participate in the synchronisation for the first of the configurable sync groups, execute an update instruction to update the indication for the first of the configurable sync groups to specify that the first of the processors does belong to the first of the configurable sync groups.

In some embodiments, the execution unit of the first of the processors is configured to, following assertion of the request to participate in the synchronisation for the second of the configurable sync groups, execute an update instruction to update the indication for the second of the configurable sync groups to specify that the first of the processors does not belong to the second of the configurable sync groups.

In some embodiments, the data processing device comprises aggregation circuitry configured to: in response to all of the processors providing a respective request to participate in the synchronisation for the first of the configurable sync groups, provide a first aggregate sync request to the sync controller; and in response to all of the processors providing the request to participate in the synchronisation for the second of the configurable sync groups, provide a second aggregate sync request to the sync controller, wherein the circuitry of the sync controller is configured to return acknowledgments to the processors in response to each of the first aggregate sync request and the second aggregate sync request.

In some embodiments, the data processing device comprises: a first sync request wire connected to the first of the processors; and a second sync request wire connected to the first of the processors, wherein the circuitry of the first of the processors is configured to, assert the request to participate in the synchronisation for the first of the configurable sync groups by asserting a signal on the first sync request wire, wherein the circuitry of the second of the processors is configured to, assert the request to participate in the synchronisation for the second of the configurable sync groups by asserting a signal on the second sync request wire.

In some embodiments, the circuitry of the first of the processors comprises a first multiplexer configured to, in dependence upon the indication that the first of the processors does not belong to the first of the configurable sync groups, select a first input so as to output a first signal representative of the request to participate in the synchronisation for the first of the configurable sync groups.

In some embodiments, the circuitry of the first of the processors comprises a second multiplexer configured to, in dependence upon the indication that the first of the processors does belong to the second of the configurable sync groups, select a second input so as to output a second signal controlled by the execution unit.

In some embodiments, the execution unit of the first of the processors is configured to, upon reaching the synchronisation point, execute a sync instruction to cause the second signal to be set to a state so as to represent the request to participate in the synchronisation for the second of the configurable sync groups.

In some embodiments, the second of the configurable sync groups comprises further processors belonging to one or more further data processing devices, wherein the first of the processors is configured to participate in the synchronisation for the second of the configurable sync groups by exchanging data with one or more of the further processors.

In some embodiments, the execution unit of the first of the processors is configured to, upon reaching the synchronisation point for the second of the configurable sync groups, execute a sync instruction to cause the assertion of the request to participate in the synchronisation for the second of the configurable sync groups.

In some embodiments, the circuitry of the first of the processors is configured to: receive from the execution unit of the first of the processors, a control signal indicating that the execution unit has reached the synchronisation point; and convert the control signal to the request to participate in the synchronisation for the second of the configurable sync groups.

In some embodiments, the first of the processors comprises a first interface configured to receive a first acknowledgment signal for the first of the configurable sync groups, wherein the circuitry of the first of the processors is configured to invert the first acknowledgment signal to produce the request to participate in the synchronisation for the first of the configurable sync groups, wherein the first of the processors comprises a second interface configured to receive a second acknowledgment signal for the second of the configurable sync groups, wherein the circuitry of the second of the processors is configured to invert the second acknowledgment signal to produce the request to participate in the synchronisation for the second of the configurable sync groups.

In some embodiments, the data processing device is an integrated circuit.

According to a second aspect, there is provided a method implemented in a data processing device comprising a plurality of processors, the method comprising: at each of the processors: storing, for each of a set of configurable sync groups, an indication as to whether or not the respective processor belongs to the respective configurable sync group; and executing a set of computer readable instructions held in memory of the respective processor, wherein for a first of the processors: the indication for a first of the configurable sync groups indicates that the first of the processors does not belong to the first of the configurable sync groups; and the indication for a second of the configurable sync groups indicates that the first of the processors does belong to the second of the configurable sync groups, wherein the method comprises: at a sync controller, receiving requests from the processors to participate in synchronisations and, in response to receiving the requests, returning acknowledgments to the processors; at a first of the processors, in response to the indication for the first of the configurable sync groups indicating that the first of the processors does not belong to the first of the configurable sync groups, asserting a request to the sync controller to participate in a synchronisation for the first of the configurable sync groups; and in response to an execution unit of the first of the processors reaching a synchronisation point for the second of the configurable sync groups indicated in the set of computer readable instructions for the first of the processors, asserting a request to the sync controller to participate in a synchronisation for the second of the configurable sync groups.

In some embodiments, the method comprises: at the sync controller, in response to all of the processors of the data processing device issuing a request to participate in the synchronisation for the first of the configurable sync groups, issuing a corresponding acknowledgment to each of the processors.

In some embodiments, the method comprises, at the sync controller: in response to the requests to participate in the synchronisation for the first of the configurable sync groups, issuing a further request to an external sync controller for the processors to synchronise with further processors belong to further devices; and subsequently, in response to receipt of a further acknowledgment of the further request from the external sync controller, returning to each of the processors, the corresponding acknowledgment to each of the processors.

In some embodiments, the method comprises, at the external sync controller: storing a set of configuration settings for the first of the configurable sync groups; and in response to the further request received from the sync controller, exchanging one or more additional requests and one or more additional acknowledgments with further devices in dependence upon the configuration settings for the first of the configurable sync groups.

In some embodiments, the method comprises, for each of the processors belonging to the first of the configurable sync groups, upon reaching a first barrier synchronisation enforced between the processors belonging to the first of the configurable sync groups, issuing a request to participate in the synchronisation for the first of the configurable sync groups; and for the first of the processors, whilst the execution units of each of the processors belonging to the first of the configurable sync groups are paused waiting at the first synchronisation barrier, proceeding with computation or data exchange without waiting at the first barrier synchronisation.

In some embodiments, the synchronisation for the second of the configurable sync groups is a second barrier synchronisation, wherein the method comprises at the first of the processors, and in response to receipt of an acknowledgment to the request to participate in the synchronisation for the second of the configurable sync groups, proceeding past the second barrier synchronisation.

In some embodiments, the method comprises at the first of the processors, proceeding past the second barrier synchronisation by entering an exchange phase in which the first of the processors at least one of: sends or receives data.

In some embodiments, the method comprises at the first of the processors, following assertion of the request to participate in the synchronisation for the first of the configurable sync groups, executing an update instruction to update the indication for the first of the configurable sync groups to specify that the first of the processors does belong to the first of the configurable sync groups.

In some embodiments, the method comprises at the first of the processors, following assertion of the request to participate in the synchronisation for the second of the configurable sync groups, executing an update instruction to update the indication for the second of the configurable sync groups to specify that the first of the processors does not belong to the second of the configurable sync groups.

In some embodiments, the method comprises: in response to all of the processors providing a respective request to participate in the synchronisation for the first of the configurable sync groups, providing a first aggregate sync request to the sync controller; in response to all of the processors providing the request to participate in the synchronisation for the second of the configurable sync groups, providing a second aggregate sync request to the sync controller; and the sync controller, returning acknowledgments to the processors in response to each of the first aggregate sync request and the second aggregate sync request.

In some embodiments, the data processing device comprises: a first sync request wire connected to the first of the processors; and a second sync request wire connected to the first of the processors, wherein the method comprises: the first of the processors asserting the request to participate in the synchronisation for the first of the configurable sync groups by asserting a signal on the first sync request wire; and the second of the processors asserting the request to participate in the synchronisation for the second of the configurable sync groups by asserting a signal on the second sync request wire.

In some embodiments, the method comprises: at a first multiplexer belonging to the first of the processors, and in dependence upon the indication that the first of the processors does not belong to the first of the configurable sync groups, selecting a first input so as to output a first signal representative of the request to participate in the synchronisation for the first of the configurable sync groups.

In some embodiments, the method comprises: at a second multiplexer belonging to the second of the processors, and in dependence upon the indication that the first of the processors does belong to the second of the configurable sync groups, selecting a second input so as to output a second signal controlled by the execution unit.

In some embodiments, the method comprises: the first of the processors, upon reaching the synchronisation point, executing a sync instruction to cause the second signal to be set to a state so as to represent the request to participate in the synchronisation for the second of the configurable sync groups.

In some embodiments, the second of the configurable sync groups comprises further processors belonging to one or more further data processing devices, wherein the method comprises, the first of the processors participating in the synchronisation for the second of the configurable sync groups by exchanging data with one or more of the further processors.

In some embodiments, the method comprises: the first of the processors, upon reaching the synchronisation point for the second of the configurable sync groups, executing a sync instruction to cause the assertion of the request to participate in the synchronisation for the second of the configurable sync groups.

In some embodiments, the method comprises: at the first of the processors: receiving from the execution unit of the first of the processors, a control signal indicating that the execution unit has reached the synchronisation point; and converting the control signal to the request to participate in the synchronisation for the second of the configurable sync groups.

In some embodiments, the first of the processors comprises a first interface, and the method comprises: receiving, at the first interface, a first acknowledgment signal for the first of the configurable sync groups; at the first of the processors, inverting the first acknowledgment signal to produce the request to participate in the synchronisation for the first of the configurable sync groups, wherein the first of the processors comprises a second interface, and the method comprises: receiving at the second interface, a second acknowledgment signal for the second of the configurable sync groups; and at the second of the processors, inverting the second acknowledgment signal to produce the request to participate in the synchronisation for the second of the configurable sync groups.

In some embodiments, the data processing device is an integrated circuit.

BRIEF DESCRIPTION OF DRAWINGS

For a better understanding of the present invention and to show how the same may be carried into effect, reference will now be made by way of example to the accompanying Figures in which:

FIG. 20 illustrates an example of a method for performing synchronisations between different configurable sync groups of processors and FIG. 21 illustrates an example of a method for signalling sync requests.

DETAILED DESCRIPTION

Figure 1:
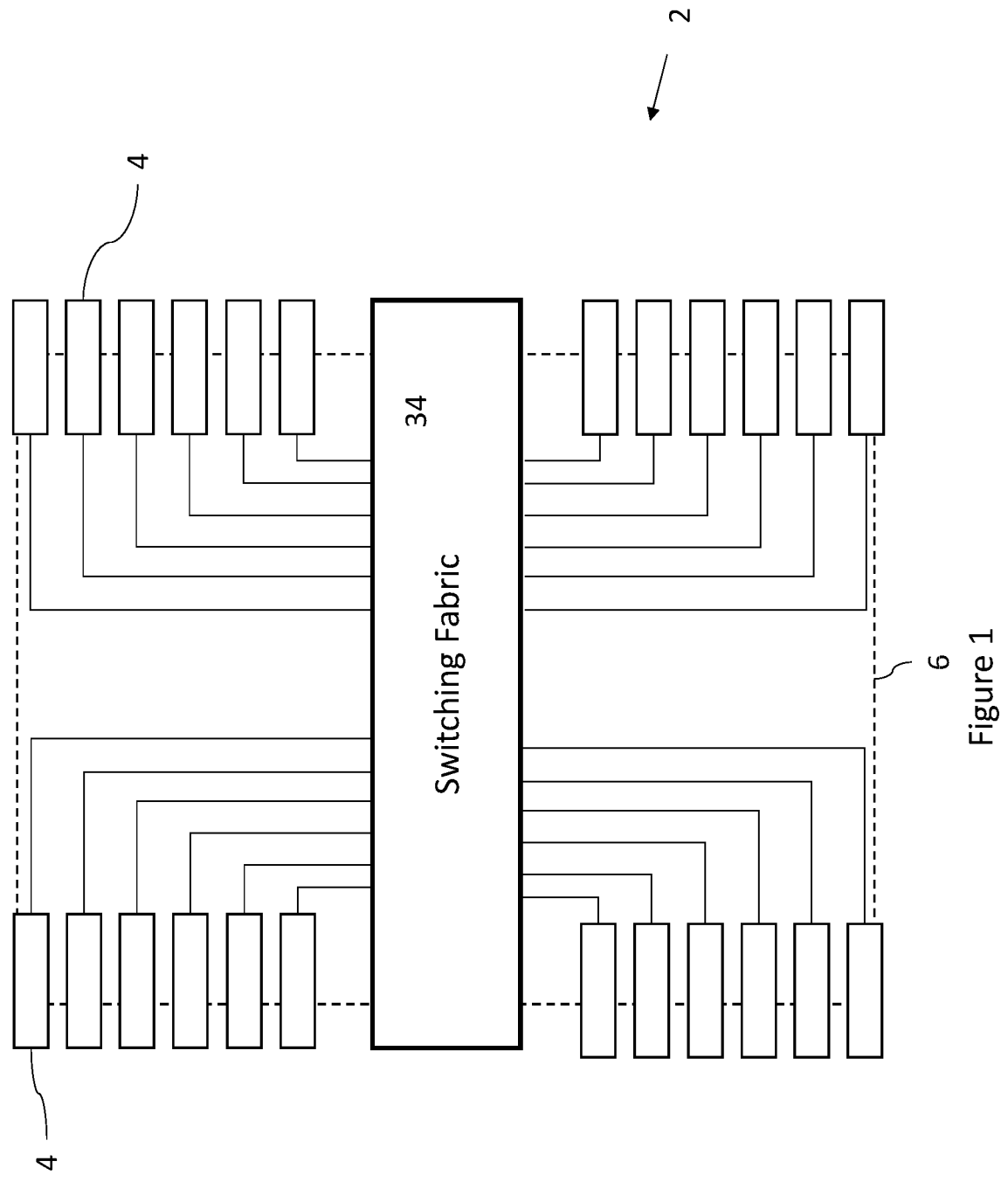
FIG. 1 illustrates an example of a multi-tile processing unit.

Reference is made to FIG. 1, which illustrates an example processing unit 2 comprising a plurality of processors 4. In the described embodiments, the processors 4 are presented as being tiles 4. However, the tiles 4 may be described more generally as being processors 4. Each such processing unit 2 is formed on an integrated circuit. The multi-tile processing unit 2 shown is described in U.S. patent application Ser. No. 15/886,065, which is incorporated by reference.

The processing unit 2 comprises an array 6 of multiple processor tiles 4 and an interconnect 34 connecting between the tiles 4. The processing unit 2 may be implemented alone as one of multiple dies packaged in the same IC package. The interconnect 34 may also be referred to herein as the "exchange fabric" 34 as it enables the tiles 4 to exchange data with one another. Each tile 4 comprises a respective instance of an execution unit and memory. For instance, by way of illustration, the processing unit 2 may comprise of the order of hundreds of tiles 4, or even over a thousand. For completeness, note also that an "array" as referred to herein does not necessarily imply any particular number of dimensions or physical layout of the tiles 4.

In embodiments, each processing unit 2 also comprises one or more external links, enabling the processing unit 2 to be connected to one or more other processing units (e.g. one or more other instances of the same processing unit 2). These external links may enable the processing unit 2 to be connected to: a host system; and one or more other instances of the processing unit 2 on the same IC package or card, or on different cards. The processing unit 2 receives work from the host, in the form of application data which it processes.

The interconnect 34 is configured to enable the different tiles 4 in the array 6 to communicate with one another. However, as well as there potentially being dependencies between threads on the same tile 4, there may also exist dependencies between the portions of the program running on different tiles 4 in the array 6. A technique is therefore required to prevent a piece of code on one tile 4 running ahead of data upon which it is dependent being made available by another piece of code on another tile 4. This is achieved using a data consistency model.

Parallel programming models for AI and Data Science usually follows a 3-phase iterative execution model: Compute, Barrier, and Exchange. The implications are that data transfer to and from a processor is usually barrier dependent to provide data-consistency between the processors, and between each processor and an external storage. Typically used data consistency models are Bulk Synchronous Parallel (BSP), Stale Synchronous Parallel (SSP) and Asynchronous. The processing unit 2 described herein uses a BSP model, but it will be apparent that the other sync models could be utilised as an alternative.

Figure 2:
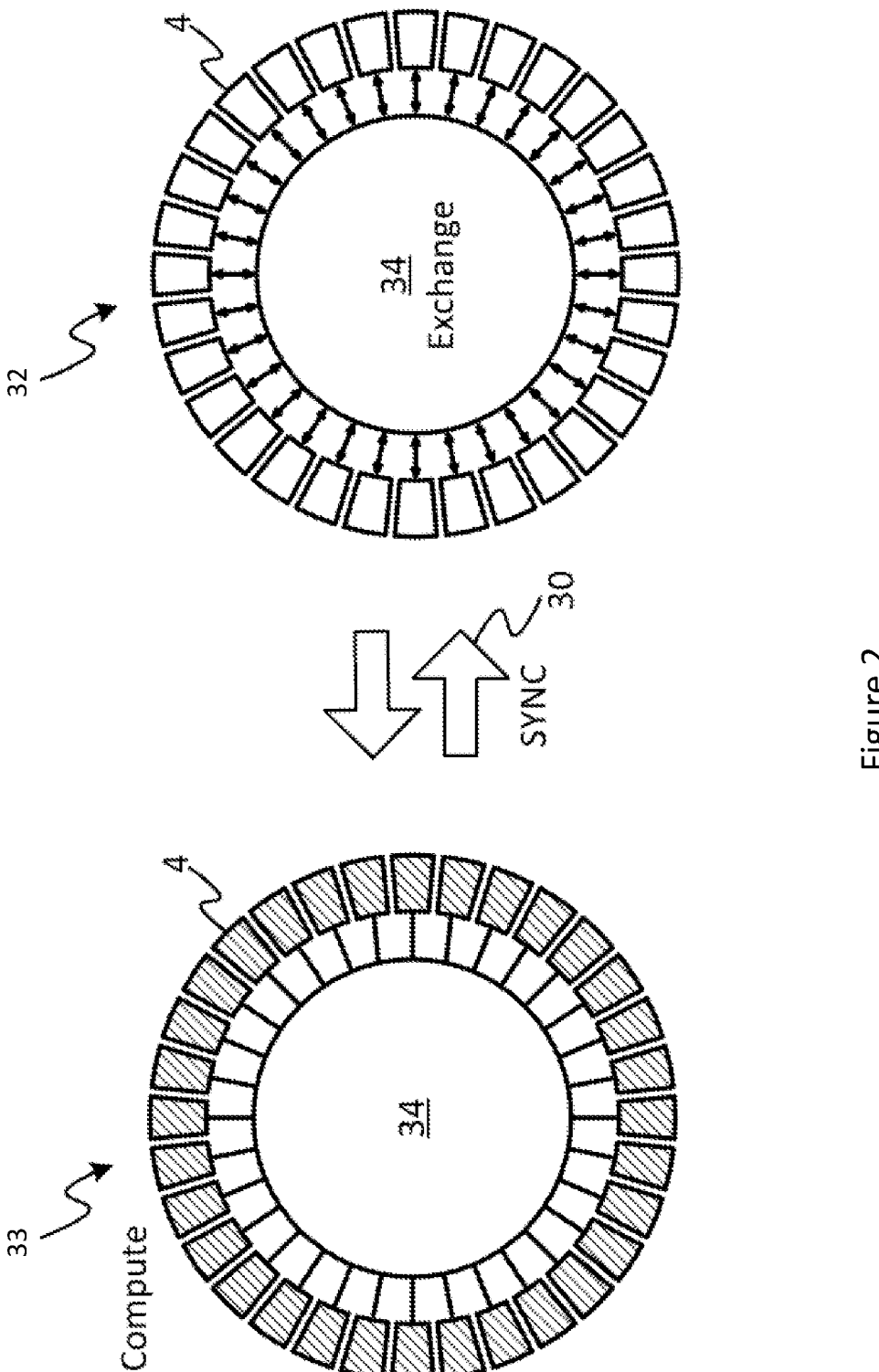
FIG. 2 is a schematic diagram illustrating the compute and exchange phases within a multi-tile processing unit.
Figure 3:
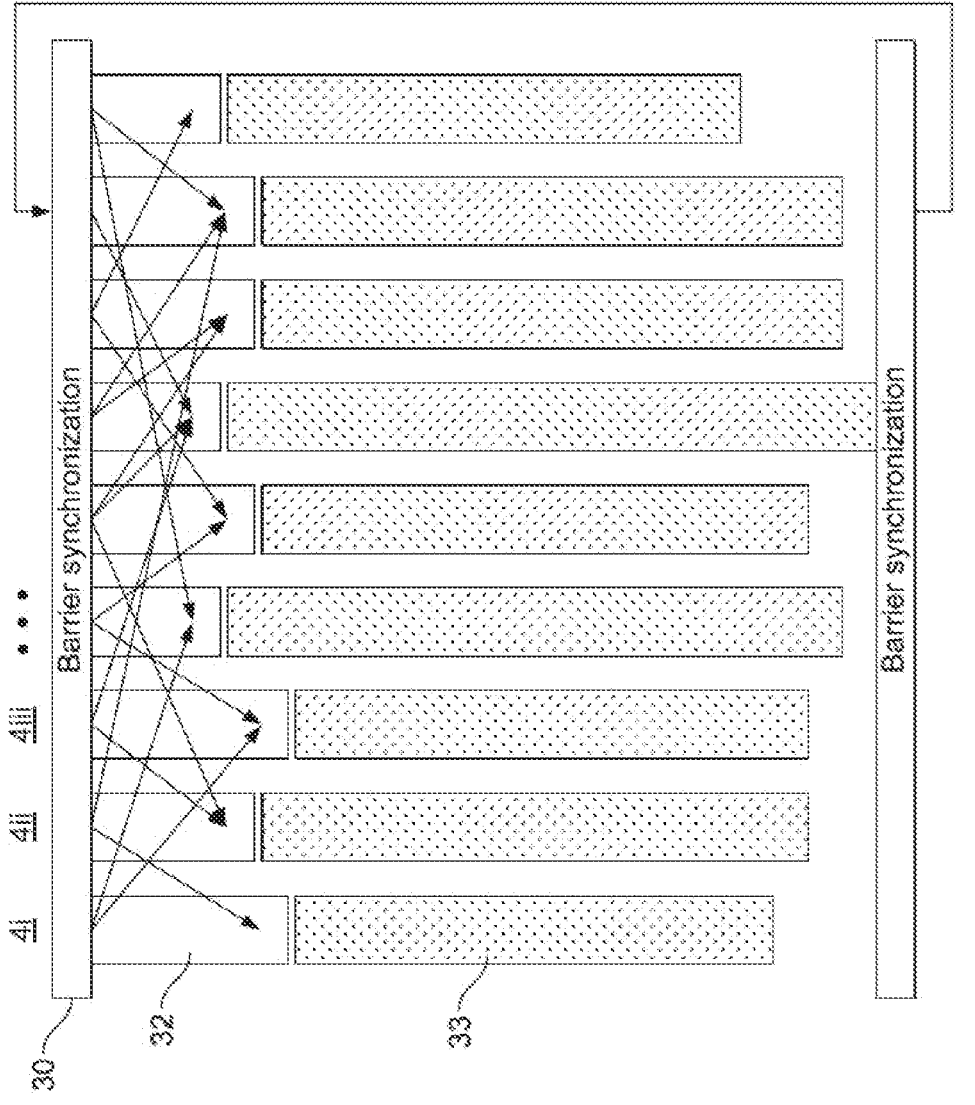
FIG. 3 illustrates exchange of data in a bulk synchronous parallel system.

Reference is made to FIGS. 2 and 3, which illustrate an implementation of a BSP exchange scheme, in which each tile 4 performs a compute phase 33 and an exchange phase 32 in an alternating cycle, separated from one to the other by a barrier synchronization 30 between tiles 4. In the case illustrated by FIGS. 2 and 3, a barrier synchronization is placed between each compute phase 33 and the following exchange phase 32. During the compute phase 33, each tile 4 performs one or more computation tasks locally on-tile, but does not communicate any results of these computations with any others of the tiles 4. In the exchange phase 32, each tile 4 is allowed to exchange one or more results of the computations from the preceding compute phase to and/or from one or more others of the tiles 4, but does not perform any new computations until it has received from other tiles 4 any data on which its task(s) has/have dependency. It is not excluded that other operations such as internal control-related operations may be performed in the exchange phase 32. The communication external to the tile group may optionally utilise the BSP mechanism, but alternatively may not utilize BSP and may instead use some other synchronization mechanism of its own.

According to the BSP principle, a barrier synchronization 30 is placed at the juncture transitioning from the compute phase 33 into the exchange phase 32, or the juncture transitioning from the exchange phase 32 into the compute phase 33, or both. That is to say, either: (a) all tiles 4 are required to complete their respective compute phases 33 before any in the group is allowed to proceed to the next exchange phase 32, or (b) all tiles 4 in the group are required to complete their respective exchange phases 32 before any tile in the group is allowed to proceed to the next compute phase 33, or (c) both of these conditions are enforced. In all three variants, it is the individual tiles 4 which alternate between phases, and the assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

FIG. 3 illustrates the BSP principle as implemented amongst a group 4i, 4ii, 4iii of some or all of the tiles in the array 6, in the case which imposes: (a) a barrier synchronization from compute phase 33 to exchange phase 32 (see above). Note that, in this arrangement, some tiles 4 are allowed to begin computing 33 whilst some others are still exchanging.

The BSP model may be used for the exchange of data between tiles 4 on the processing unit 2. The communication between tiles 4 of a processing unit 2 occurs in time deterministic fashion, in which data packets are transmitted without headers as in our earlier application U.S. patent application Ser. No. 15/886,065. Additionally, the BSP model may also be used for the exchange of data between processing units 2.

Figure 4:
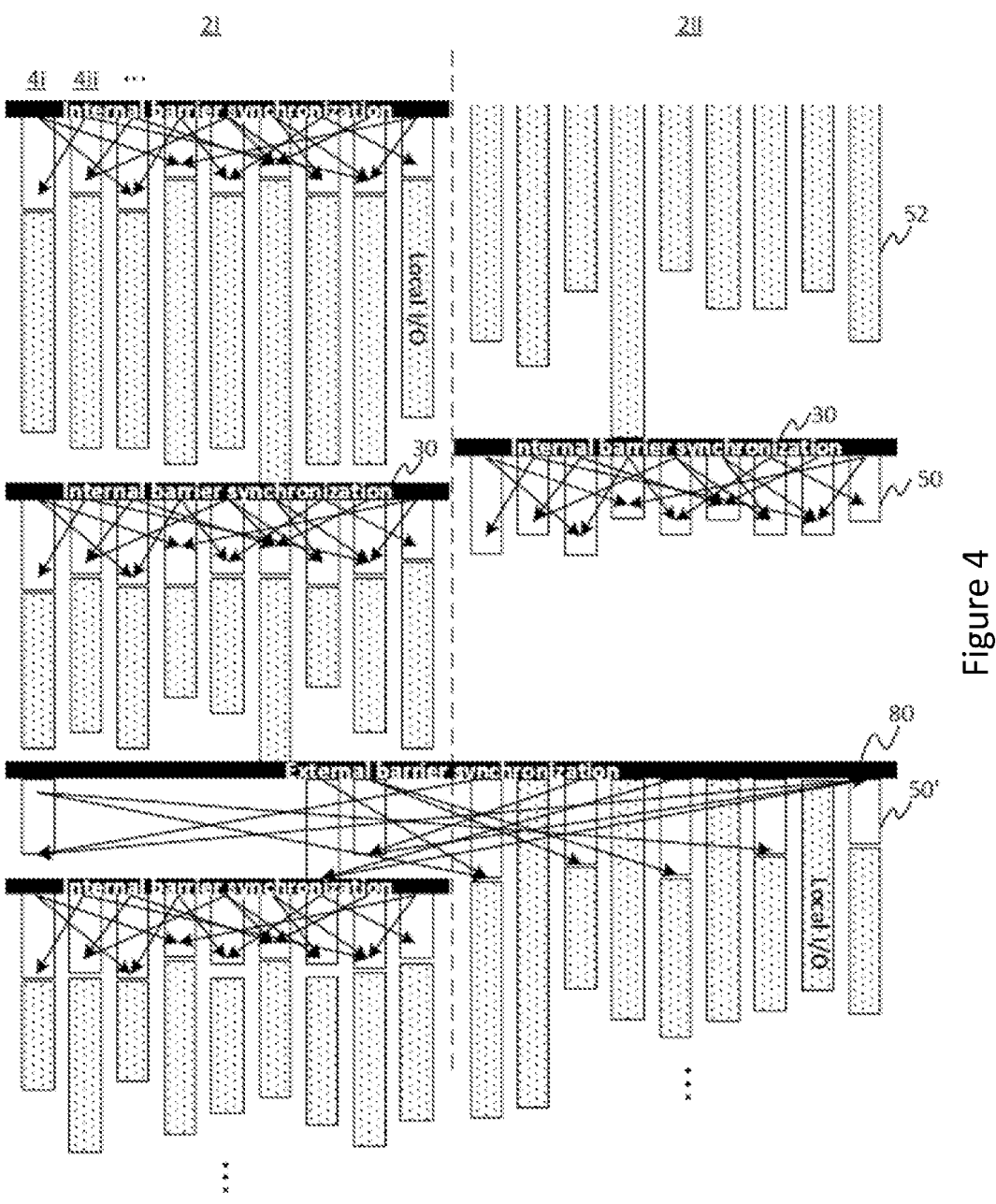
FIG. 4 is a schematic illustration of internal and external synchronisation barriers.

Reference is made to FIG. 4, which illustrates an example BSP program flow involving both internal (i.e. between tiles 4 of a single processing unit 2) and external (i.e. between processing units 2) synchronizations. As shown, the flow comprises internal exchanges 50 (of data between tiles 4 of the same processing unit 2) and an external exchange 50' (of data between tiles 4 of different processing units 2). The program flow in FIG. 4 illustrates a program flow for a first processing unit 2i and a second processing unit 2ii.

As illustrated in FIG. 4, the internal BSP supersteps (comprising the internal exchanges 50 of data between tiles 4 of the same processing unit 2) are kept separate from the external sync and exchange (comprising the external exchanges 50' of data between tiles 4 of different processing units 2).

The program may be arranged to perform a sequence of synchronizations, exchange phases and compute phases comprising, in the following order: (i) a first compute phase, then (ii) an internal barrier synchronization 30, then (iii) an internal exchange phase 50, then (iv) an external barrier synchronization 80, then (v) an external exchange phase 50'. The external barrier 80 is imposed after the internal exchange phase 50, such that the program only proceeds to the external exchange 50' after the internal exchange 50. Note also that, as shown with respect to processing unit 2l in FIG. 4, optionally a compute phase may be included between (iii) internal exchange and (iv) external barrier.

This overall sequence is enforced by the program (e.g. being generated as such by the compiler). In embodiments, the program is programmed to act in this way by means of a SYNC instruction executed by the tiles 4. The internal synchronization and exchange does not extend to any tiles or other entities on another processing unit 2. The sequence (i)-(v) (with the aforementioned optional compute phase between (iii) and (iv)) may be repeated in a series of overall iterations. Per iteration there may be multiple instances of the internal compute, sync and exchange (i)-(iii) prior to the external sync & exchange. I.e. multiple instances of (i)-(iii) (retaining that order), i.e. multiple internal BSP supersteps, may be implemented before (iv)-(v), i.e. the external sync and exchange. Note also, any of the tiles 4 may each be performing their own instance of the internal synchronization and exchange (ii)-(iii) in parallel with the other tiles 4.

Thus per overall BSP cycle (i)-(v) there is at least one part of the cycle (ii)-(iii) wherein synchronization is constrained to being performed only internally.

Note that during an external exchange 50 the communications are not limited to being only external: some tiles 4 may just perform internal exchanges, some may only perform external exchanges, and some may perform a mix.

Also, as shown in FIG. 4, some tiles 4 may perform local input/output during a compute phase. For example, they may exchange data with a host or other type of external storage.

Note also that, as shown in FIG. 4, it is in general possible for any or all tiles to have a null compute phase 52 or a null exchange phase 50 in any given BSP superstep.

For both internal barrier synchronisations and external barrier synchronisations, the tiles 4 taking part in the barrier synchronisation are referred to as a synchronisation group. A set of configurable synchronisation groups is supported by the processing unit 2, where each of these configurable synchronisation groups is referred to herein as a synchronisation zone. Each of the tiles 4 may subscribe to a particular synchronisation zone, thus permitting an arbitrary group of tiles to sync together. Each of the synchronisation zones is individually configurable to comprise different synchronisation groups of tiles 4 in dependence upon settings for the respective synchronisation zone. By modifying these settings individual tiles 4 may be associated or disassociated with synchronisation zones. A synchronisation zone supported for a particular processing unit 2 may be configured as internal, in which case the tiles 4 of that processing unit 2 that are subscribed to that zone only sync with one another. On the other hand, a synchronisation zone supported for a particular processing unit 2 may be configured as external, in which case, the zone extends across multiple processing units 2, with tiles 4 of one processing unit 2 participating in the zone synchronising with tiles 4 of another processing unit 2 participating in the zone.

For each of the tiles 4 of a processing unit 2 that belong to a synchronisation zone, once that tile 4 reaches a barrier synchronisation, it issues a sync request. The sync request issued by the tiles 4 are aggregated to form an internal sync request which is provided to sync logic for the processing unit 2.

In embodiments, the sync logic comprises an internal sync controller 55 and an external sync controller 58, which are described in more detail later. In response to receipt of an internal sync request may, prior to acknowledging the request, propagate an external sync request to a further entity of the sync zone. The further entity could be a proxy for exchanging data with a host system or sync logic associated with another processing unit 2.

Where an external sync request is propagated to sync logic associated with another processing unit 2, the action taken by the sync logic associated with that other processing unit 2 in response to the external sync request depends upon whether that logic is defined as the master for the sync zone or as a propagation node for the sync zone. The propagation nodes for a sync zone propagate their received external sync requests towards the master defined for the sync zone. The sync master, once it has received external sync requests for each of the processing units 2 containing tiles 4 belonging to the sync zone, returns external sync acknowledgments to the sync logic associated with each of those other processing units 2 (apart from its own processing unit 2) containing tiles 4 belonging to the sync zone. The sync master also causes sync acknowledgments to be returned to each of the tiles 4 in its own processing unit 2. The sync logic (which comprises a propagation node) associated with each of the processing units 2, upon receiving an external sync acknowledgment originating from the sync master, returns sync acknowledgments to those tiles 4 of its processing unit 2. In response to receiving the sync acknowledgements, the tiles 4 of the sync zone pass the barrier synchronisation and exchange data with one other during the exchange phase. This exchange of data between different processing units 2 is done in a non-time deterministic manner as described in our earlier application, U.S. application Ser. No. 15/886,065.

In this description, the term sync network is used to refer to the connected sync propagation nodes/circuits for a sync zone that are used to exchange sync requests/acknowledgments so as to co-ordinate a barrier synchronisation between tiles 4 belonging to a sync zone. Sync requests transmitted towards the master node defined in the sync network are said to be transmitted "upstream" in the sync network. Sync acknowledgements transmitted towards the slave nodes defined in the sync network are said to be transmitted "downstream" in the sync network. The concept of a sync network is described in further detail with respect to FIG. 19.

Figure 5:
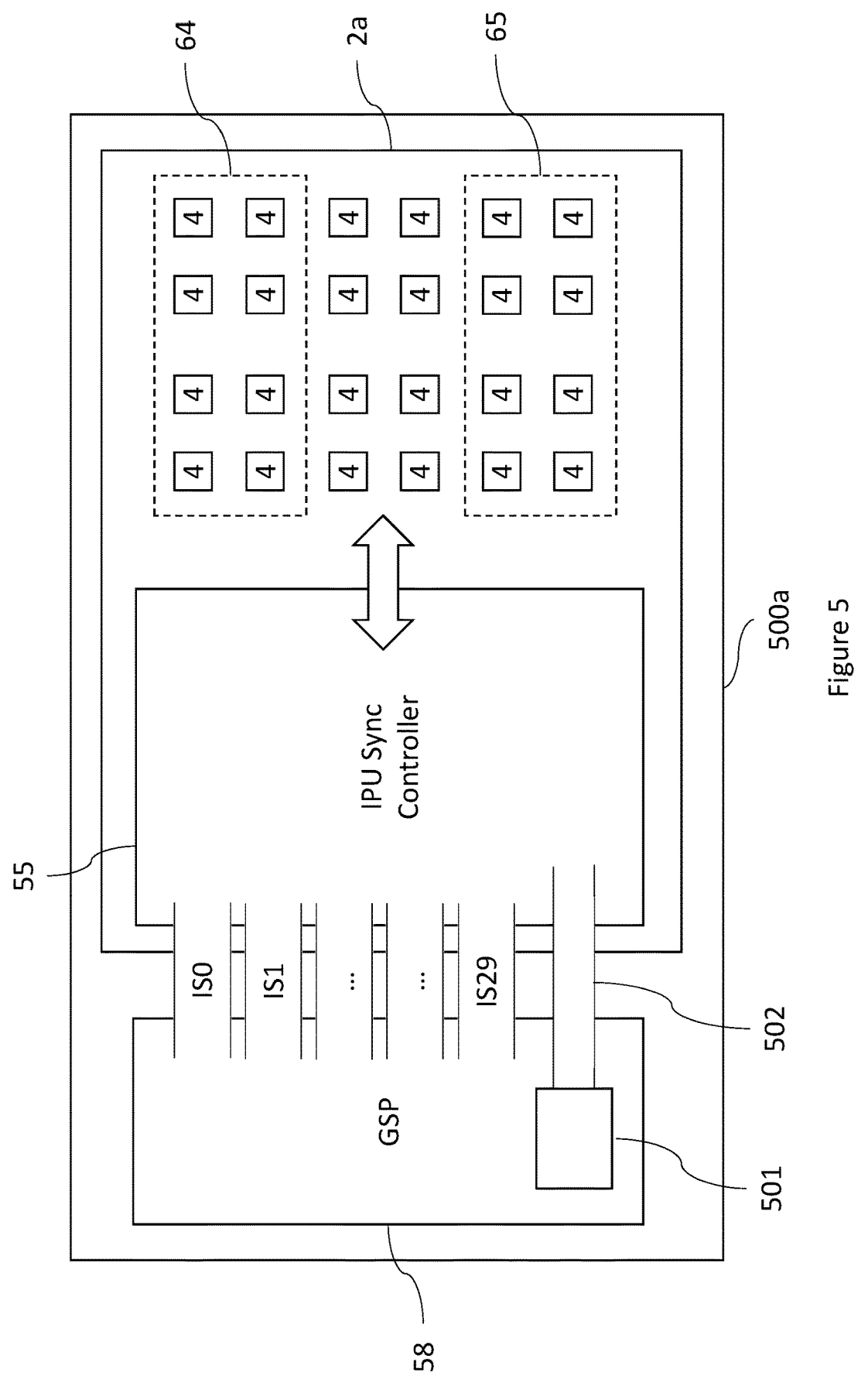
FIG. 5 is a schematic illustration of an integrated circuit comprising a multi-tile processing unit and sync controller circuitry.

Reference is made to FIG. 5, which illustrates an example of an integrated circuit 500a (i.e. a chip 500a). A plurality of similar such chips may be connected together. In the remainder of this description, the connected chips, of which the example chip 500a is one, are referred to as chips 500. Each chip 500 comprises a processing unit 2 comprising tiles 4. Each chip 500 may also be referred to as a processing device 500 or as an accelerator subsystem 500, since the processing unit 2 of each chip 500 functions as an accelerator for processing workloads provided by a host system. Although the processing devices 500 are described as being chips 500 throughout this description, it is not excluded that in some embodiments, such processing devices 500 could be implemented on the same integrated circuit.

To identify it from amongst the plurality of chips 500, the specific chip shown in FIG. 5 is referred to as chip 500a. Similarly, to identify it from amongst the plurality of processing unit 2, the specific processing unit shown in FIG. 5 is referred to as processing unit 2a. The features of the chip 500a and processing unit 2a described below, are also features of each of the chips 500 and processing units 2.

Each of the tiles 4 in the processing unit 2a may participate in different types of barrier sync. AA first type of barrier sync is an internal sync, in which only tiles 4 of the same processing unit 2a participate.

A second type of sync is an external wired sync in which the sync zone for the sync, in addition to including tiles 4 of processing unit 2a, also includes tiles 4 on one or more chips 500 that are accessible over local wired connections. For the external wired sync, the sync messages are exchanged between the chips 500 over dedicated wires used for the transmission of different types of sync message. The application data that is exchanged between the chips 500 during the exchange phase for an external wired sync is sent over PCIe connections between the chips 500 participating in the sync.

A third type of sync is an external sync with host involvement. In this case, a host sync proxy (HSP) participates in the barrier sync by exchanging sync messages with the processing unit 2a, prior to an exchange phase in which data is exchanged between the host and the tiles 4 of the processing unit 2a.

A fourth type of sync is an external packet-based sync in which the sync group for the sync, in addition to including tiles 4 of processing unit 2*a*, also includes tiles 4 on one or more chips 500 that are accessible over a packet-switch network (e.g. an Ethernet network). For the external packet-based sync, in addition to sending the application data between the chips 500 over a packet-switched network, the sync messages are also sent over the same packet-switched network.

To enable each of the tiles 4 in the processing unit 2*a* to participate in the different types of sync, a plurality of sync zones are provided for the processing unit 2*a*. In embodiments, there are 30 different sync zones provided for the processing unit 2*a*, with each of these sync zones being configurable to include one or more of the tiles 4 of the processing unit 2*a*. Each sync zone is individually configurable to comprise different sync groupings of tiles 4.

Each of the sync zones may be configured as an external sync zone (in which case the corresponding sync group includes tiles 4 of other processing units 2) for an external barrier synchronisation or as an internal sync zone (in which case the sync group for that sync zone is limited to tiles 4 of the processing unit 2*a*) for an internal barrier synchronisation.

The sync zones may be categorised into different sets depending upon the hardware provided for that sync zone and, consequently, the type of syncs that be implemented using that sync zone. A first set of the sync zones are sync zones that may be configured for use for either for the first type of sync discussed above (i.e. internal sync) or the second type of sync discussed above (i.e. external wired sync). In the embodiments in which there are 30 sync zones defined for the processing unit 2*a*, the first 22 of these zones (labelled sync zones 1-22) belong to the first set of sync zones.

Of the first set of sync zones, a subset of these sync zones may also be used for communication with host involvement, i.e. they may be used for the third type of sync discussed above. In embodiments in which the first set of sync zones comprises 22 sync zones, two of these sync zones (labelled sync zones 1 and 2) may be used for barrier synchronisations following which data exchange is carried out between the host and the tiles 4 of the processing unit 2*a*.

A second set of the sync zones are sync zones that may be used either for the first type of sync discussed above (i.e. internal sync) or the fourth type of sync discussed above (i.e. external packet-based sync). In the embodiments in which there are 30 sync zones defined for the processing unit 2*a*, the last eight of these zones (labelled sync zones 23-30) belong to the second set of sync zones.

As described above, in order to co-ordinate synchronisations between different tiles 4 that are part of a sync zone, an exchange of synchronisation requests and synchronisation acknowledgments is performed between the tiles 4. The paths through the sync network by which the sync requests are propagated and acknowledged will depend upon the configuration setting for the sync zone that are in use in order to co-ordinate the sync between the tiles 4 belonging to the sync group.

In the following description, multiple types of sync request and acknowledgment signals are described for use in different parts of the sync network. To distinguish these signals, the following terminology is adopted.

Each tile 4 has a sync request wire for each sync zone. The state of this wire is referred to herein as tile sync request state. When the state of the wire is set to indicate that a sync request is asserted by the tile 4, the resulting sync request is referred to as a tile sync request. Each tile 4 comprises an execution unit 52, which may control the state of the sync request wires. For any such wire, the signal output by the execution unit 52 and used to assert a tile sync request on that wire is referred to as the sync control signal.

Each tile 4 also has a sync acknowledgment wire for each sync zone. The state of this wire is referred to herein as the internal sync acknowledgment state. When the state of the wire indicates a sync acknowledgment is asserted by the tile 4, the resulting sync acknowledgment is referred to as an internal sync acknowledgement. The execution unit 52 is responsive to pulses generated in response to edges in the internal sync acknowledgment state. Such a pulse is referred to herein as a sync ack pulse.

Aggregation circuitry is provided in the processing unit 2*a* for aggregating the sync request state of all of the tiles 4 in the processing unit 2*a*. The state of the signal output by each such unit of aggregation circuitry is referred to herein as aggregate sync request state, and a sync request signalled by the aggregate sync request state is referred to as an aggregate sync request. The aggregate sync request state of all of the tiles 4 of the processing unit 2*a* is referred as internal aggregate sync request state and a sync request signalled by such state is referred to as an internal sync request. Such an internal sync request is provided as an input to the internal sync controller 55, which responds by outputting a corresponding internal sync acknowledgment. This internal sync acknowledgment is propagated to all of the tiles 4 of the processing unit 2*a*.

The internal sync controller 55 for certain configured sync zones, outputs a sync request to the external sync controller (the GSP 58) in response to the internal sync request. This sync request is referred to as an external sync request. The GSP 58 responds by returning a sync acknowledgment to the internal sync controller 55. This returned acknowledgment is referred to as external sync acknowledgment.

FIG. 5 shows that the processing unit 2*a* includes sync controller circuitry 55 (shown as the IPU sync controller 55) between the tiles 4 and the GSP 58. The IPU sync controller 55 may also be referred to as the internal sync controller 55, since it acknowledges internal sync requests for internal barrier synchronisations without requiring input from the GSP 58. The IPU sync controller 55 receives internal sync requests represented by aggregate sync request state output by the tiles 4, and performs an action in dependence upon settings in a register 501 of the GSP 58. The settings in the register 501 define for each sync zone whether that sync zone is defined as internal or as external. Indications of the settings in register 501 are provided to the IPU sync controller 55 over interface 502 between the GSP 58 and the IPU sync controller 55. Any of the 30 sync zones may be defined as either external or internal.

When an internal sync request is received at the IPU sync controller 55 and the sync zone for that sync request is defined in register 501 as being an external sync zone, the IPU sync controller 55 responds by providing an external sync request to the GSP 58 on an interface of the GSP 58 associated with the particular sync zone for the sync. As shown in FIG. 5, the GSP 58 has a number of interfaces (labelled as IS0 to IS29), each of which is associated with one of the sync zones provided for the processing unit 2*a*. The sync controller 55 provides the external sync request over one of the interfaces (IS0 to IS29) that is associated with the same sync zone as the internal sync request. In response, the GSP 58 will return an external sync acknowledgment, which is sent over the same one of the interfaces IS0 to IS29 over which the external sync request was provided. In response to the external sync acknowledgment returned from the GSP 58, the sync controller 55 outputs an internal sync acknowledgement to each of the tiles 4 in the processing unit 2*a*.

When an internal sync request associated with a particular sync zone is received at the IPU sync controller 55, if that sync zone is defined in register 501 as being as internal sync zone, the IPU sync controller 55 causes an internal sync acknowledgment to be sent to the tiles 4 of the processing unit 2*a*. The IPU sync controller 55 performs this action without waiting for an external sync acknowledgment from the GSP 55 The IPU sync controller 55 may, however, also pass an external sync request signal to the GSP 58, such that it is asserted on an interface of the GSP 58 that is associated with the sync zone. This enables the GSP 58 to log trace data for the sync.

To send and receive internal sync requests and internal sync acknowledgments, the IPU sync controller 55 includes a plurality of sets of wires, with each set of wires being associated with a different sync zone. Each set of wires includes at least a sync request wire, on which an internal sync request for the respective sync zone is received, and a sync acknowledgment wire on which an internal sync acknowledgment for the respective sync zone is sent to the tiles 4.

To send and receive external sync requests and external sync acknowledgments, the IPU sync controller 55 includes a plurality of sets of wires, with each set of wires being associated with a different sync zone. Each set of wires is also associated with a different one of the GSP 58 interfaces IS0 to IS29 and is used to pass external sync requests to the GSP 58 and receive external sync acknowledgments from the GSP 58 for the respective sync zone.

In order to ensure that each tile 4 indicates in which sync zone it is to participate, each individual tile 4 also has a plurality of dedicated sync request wires, each of which is associated with one of the sync zones defined for the processing unit 2*a*. Each tile 4, when it is to participate in a barrier synchronisation associated with a particular sync zone, issues a tile sync request on a sync request wire associated with that sync zone. Each tile 4 also has a plurality of dedicated sync acknowledgment wires, each of which is associated with one of the sync zones defined for the processing unit 2*a*. Each tile 4, after issuing a tile sync request on a sync request wire for a sync zone, receives from the sync controller 55, the internal sync acknowledgment on its sync acknowledgment wire associated that sync zone. In response, the tile 4 then progress to the exchange phase following the barrier synchronisation.

Figure 6:
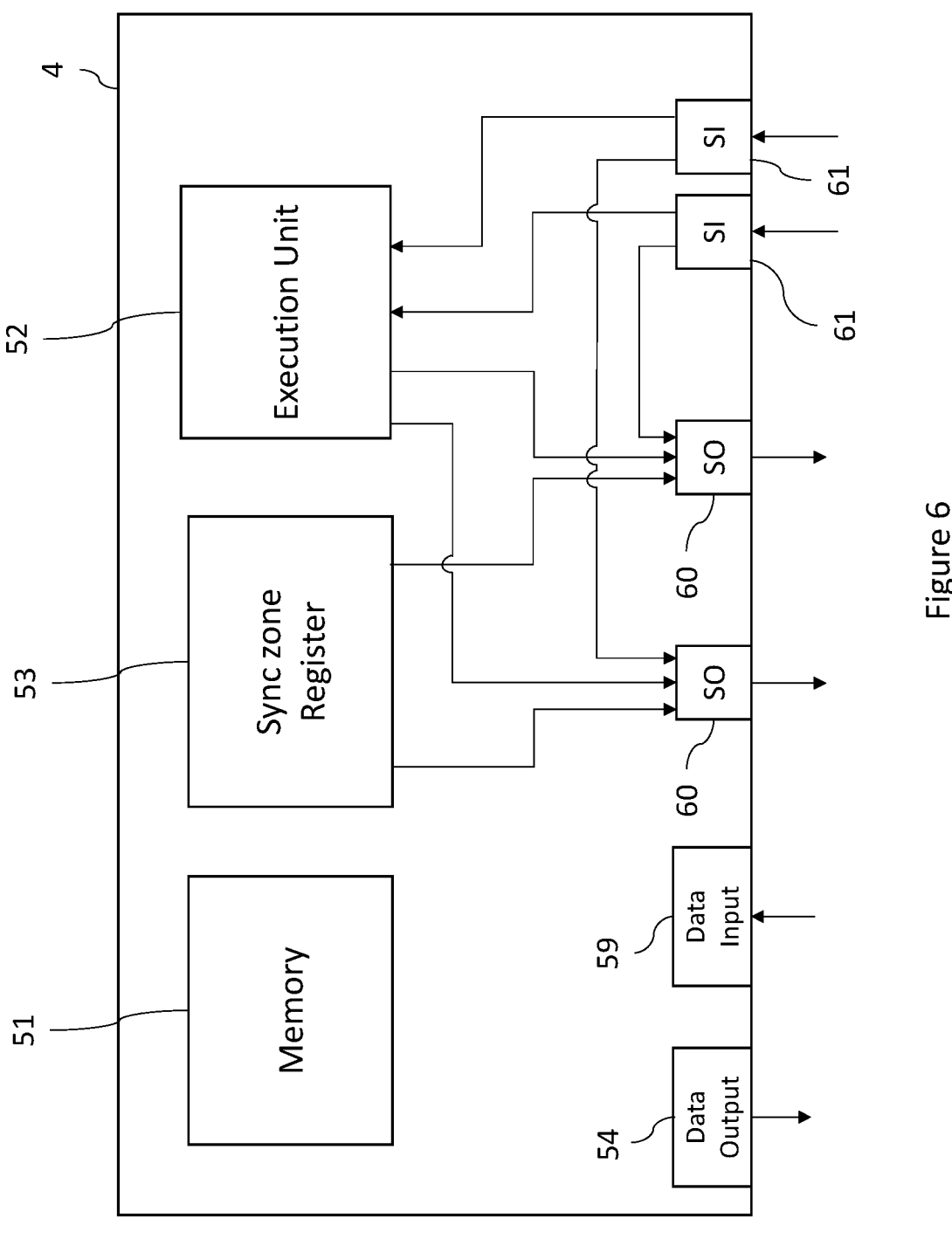
FIG. 6 is a schematic illustration of a processor tile.

Reference is made to FIG. 6, which illustrates an example of a tile 4 according to example embodiments of the application. The tile 4 comprises a memory 51 for storing both instructions for execution by the execution unit 52 and data that the execution unit 52 is configured to perform operations on when executing the instructions. The memory 51 comprises a local program for its respective tile 4, where that local program comprises instructions to be executed by the execution unit 52. The set of instructions (or code) for each tile 4 comprise indications of synchronisation points at which the tile 4 is to participate in a barrier synchronisation. The indications comprise SYNC instructions, which are for execution by the respective execution unit 52 when the tile 4 reaches the synchronisation point in its local program. Each such SYNC instruction described below is executed when the execution unit 52 of the respective tile 4 reaches a given synchronisation point, and causes a sync request to be issued to the sync controller in relation to the barrier synchronisation to be performed at that synchornisation point.

The tile 4 comprises a sync zone register 53, which stores, for each of the plurality of sync zones defined for processing unit 2, an indication as to whether or not the tile 4 belongs to the respective sync zone. The sync zone register 53 comprises a bitmap, where each bit indicates whether or not the tile 4 belongs to a different one of the sync zones.

In order to modify the sync zones to which it belongs, the execution unit 52 of the tile 4 may execute instructions to modify the indications held in the sync zone register 53. In some embodiments, the sync zones to which each of the tiles 4 of the processing unit 2*a* belong are fixed for a particular application. In other embodiments, during the running of an application, the execution units 52 of one or more tiles 4 of the processing unit 2*a* execute instructions to modify the sync zone indications held in their registers 53 in order to change the sync zones to which they belong.

The tile 4 comprises a data output interface 54, which is used for sending, during internal exchange phases, data to other tiles 4 belonging to the same processing unit 2*a* and for sending, during external exchange phases, data to destinations external to the device 500*a*. The tile 4 comprises a data input interface 59, which is used for receiving, during internal exchange phases, data from other tiles 4 belonging to the same processing unit 2*a* and for receiving, during external exchange phases, data from sources external to the device 500*a*.

The tile 4 comprises a plurality of sync output interfaces 60, which are used for outputting tile sync request state from the tile 4 towards the internal sync controller 55. The tile 4 also comprises a plurality of sync input interfaces 61 for receiving internal sync acknowledgments from the sync controller 55 and notifying the execution unit 52. Each of the sync output interfaces 60 is associated with a different sync zone and is used for sending a tile sync request for its associated sync zone on a corresponding sync request wire. Each of the sync input interfaces 61 is associated with a different sync zone and is used for receiving an internal sync acknowledgment for its associated sync zone on a corresponding sync acknowledgment wire. Although, for simplification, the tile 4 is shown as comprising only two sync output interfaces 60 and two sync input interfaces 61, in practice the tile 4 would comprise more than two (e.g. 30) of each type of interface 60, 61.

The tile 4 is configured to output a tile sync request for a sync zone by setting the state of the relevant sync request wire to the opposite of the state of the corresponding sync acknowledgment wire for the sync zone. For example, if the internal sync acknowledgment signal for a particular sync zone is set low, in order to assert a tile sync request, the signal on the corresponding sync request wire is set high. Conversely, if the internal sync acknowledgment signal for a particular sync zone is set low, in order to assert a tile sync request, the signal on the corresponding sync request wire is set high.

Figure 7:
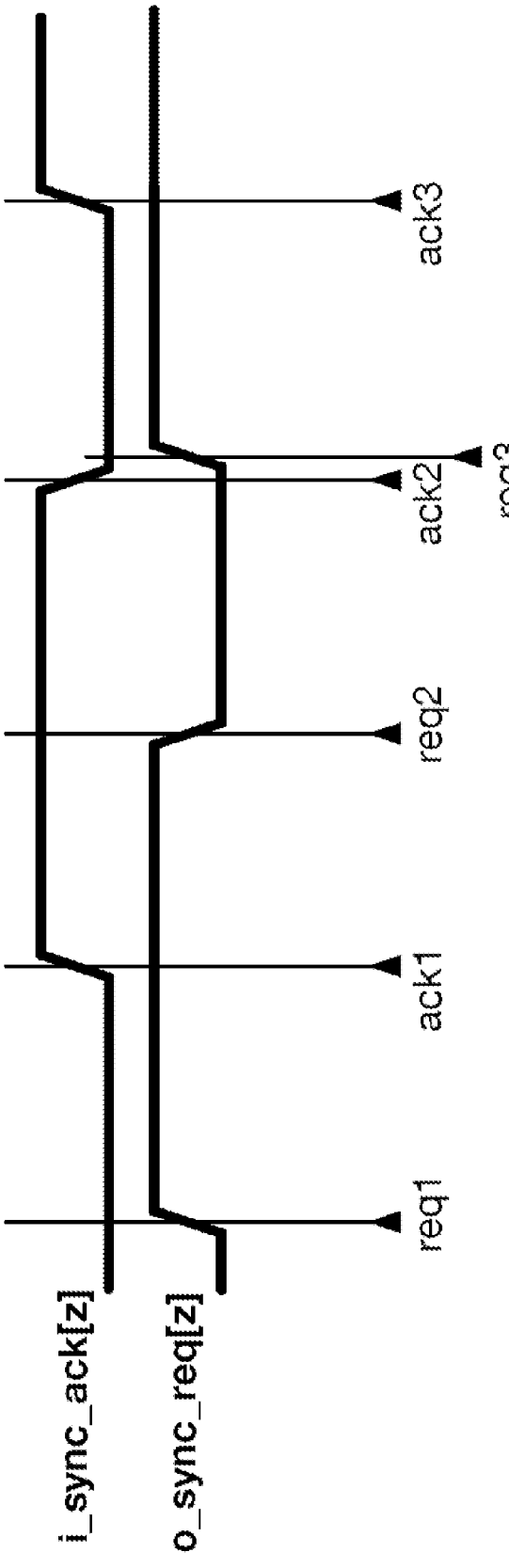
FIG. 7 illustrates a timeline of the state of a sync request wire of a tile and the corresponding sync acknowledgment wire of that tile.

Reference is made to FIG. 7, which illustrates a timeline over which a plurality of tile sync requests are issued by a tile 4. The sync request and acknowledgment signals shown are for a particular sync zone, labelled 'z', in which the tile 4 is configured to participate. Hence, the sync request wire, output interface 60, sync acknowledgment wire, and input interface 61 that are discussed are those for sync zone z.

Initially, the state of sync acknowledgment wire of the tile 4 is held low. The execution unit 52 of the tile 4 executes a SYNC instruction to cause a tile sync request (i.e. req1) to be asserted on the sync request wire. Circuitry of the output interface 60 causes the tile sync request (i.e. req1) to be issued by setting the state of the sync request wire to be opposite to the state of the sync acknowledgment wire. Since the acknowledgment wire is held in a low state, the tile sync request is issued by setting the state of the sync request wire to be high. The tile sync request is represented by the transition of the sync request signal from low to high.

At some point following the assertion of the tile sync request, an internal sync acknowledgment (i.e. ack1) is received at the input interface 61 the tile 4. The internal sync acknowledgment is detected when the sync acknowledgement wire changes state, i.e. when an edge in the received sync acknowledgment is detected. Following the issuance of the tile sync request 'req1', the sync request wire of the tile 4 is held in a high state. The internal sync acknowledgment 'ack1' is received at the tile 4 once the sync acknowledgment wire is also set to a high state. Once the transition reflecting the reception of 'ack1' has occurred, the sync request wire and the sync acknowledgment wire are then both held in the high state. Since both wires are held in the same state, the tile sync request (i.e. req1) is no longer asserted. The transition point at which ack1 is received, therefore, also reflects the point at which req1 is deasserted.

After ack1 is received, the execution unit 52 moves into the exchange phase during which it may execute one or more SEND instructions to cause data from memory 51 to be sent over the data output interface 54.

To participate in a further barrier synchronisation, the execution unit 52 executes a further SYNC instruction to causes a further tile sync request (i.e. req2) to be issued. In this case, since the corresponding sync acknowledgment wire is set to a high state, the further tile sync request (i.e. req2) is issued by setting the sync request wire to a low state. The tile sync request remains asserted until the corresponding acknowledgment (i.e. ack2) is received when the sync acknowledgment wire is set to a low state.

Following the receipt of ack2, the execution unit 52 proceeds to execute a further SYNC instruction causing the next tile sync request (i.e. req3) to be issued by setting the sync request wire to be set to a high state. This tile 4 sync request remains asserted until the sync acknowledgment wire is also set to a high state, marking the receipt of ack3.

As shown in FIG. 6, in addition to the execution unit 52, the values of the sync zone register 53 may be used to control the state of the sync request wires. The control of the state of the sync request wires in dependence upon the values within the sync zone register 53 enables a barrier sync for a particular sync zone to proceed even if the tile 4 does not belong to that particular sync zone and is not configured to participate. Supposing that for a particular sync zone, the sync zone register 53 comprises an indication that the tile 4 does not belong to that sync zone. In that case, the sync output interface 60 for that particular sync zone is configured to output a tile sync request in response to the indication in the register 53 that the tile 4 does not belong to that sync zone. As long as the indication in register 53 is such that the tile 4 does not belong to the sync zone, the sync output interface 60 continues to output the tile sync request irrespective of the activity of the execution unit 52. The execution unit 52 may continue to execute additional instructions for performing computations during a compute phase or may execute SYNC instructions to participate in barrier synchronisations with respect to other sync zones. In this way, the tile 4 may operate asynchronously with respect to the compute-exchange cycles of the other tiles 4 that do belong to the sync zone in which the tile 4 of FIG. 6 is not participating.

Figure 8A:
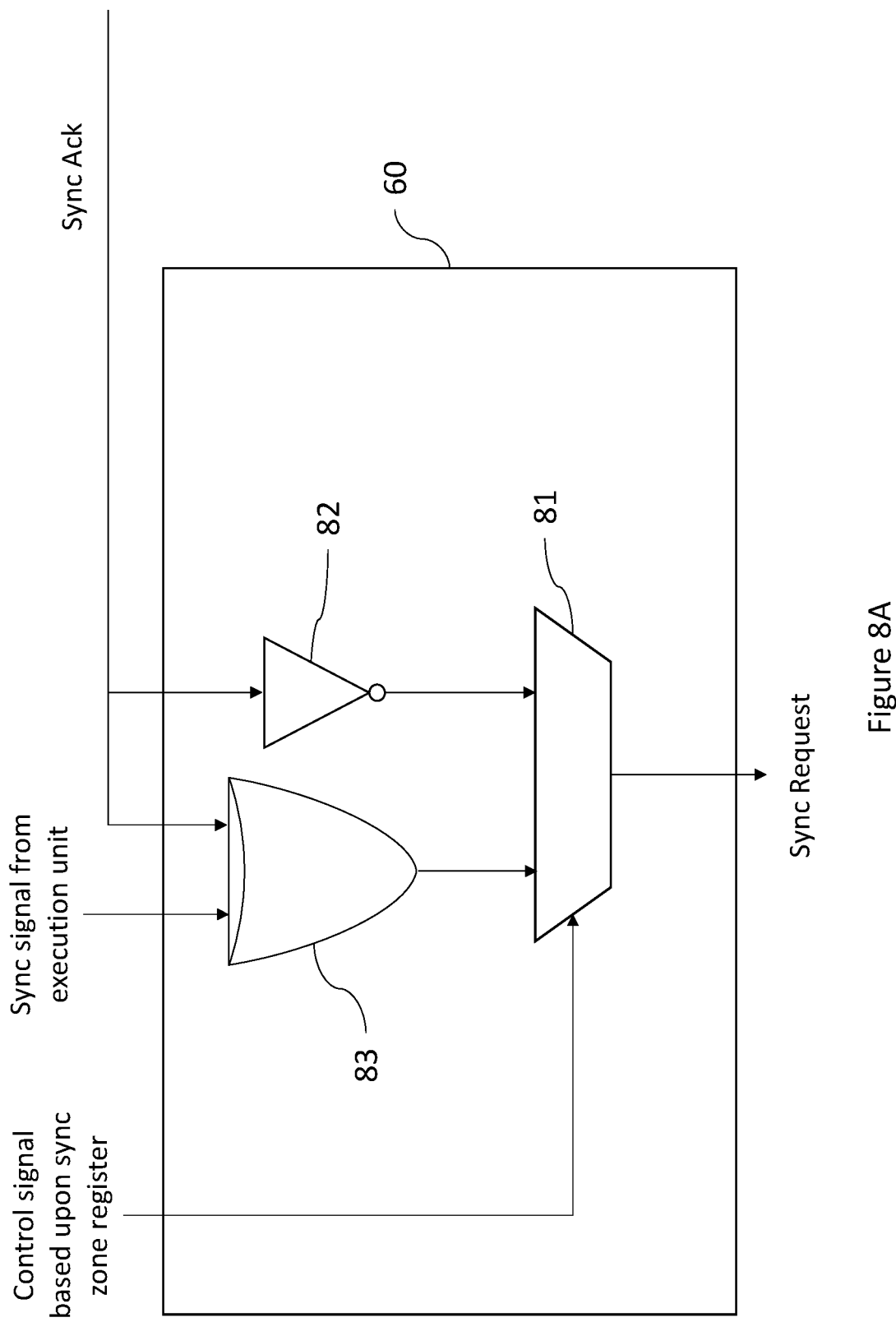
FIG. 8A is a schematic illustration of a sync output interface of a tile for outputting sync requests towards a sync controller for the processing unit.

Reference is made to FIG. 8A, which illustrates an example of a sync output interface 60. The sync output interface 60 comprises an inverter 82 configured to invert the internal sync acknowledgment signal, so as to provide a signal that may be output to provide a tile sync request when the tile 4 is not participating in the sync zone associated with the interface 60. The sync output interface 60 comprises a multiplexer 81, which is controlled in dependence upon the indication in the register 53 to select between outputting the inverted form of the internal sync acknowledgment supplied by the inverter 82 or outputting a sync signal controlled by the execution of SYNC instructions by the execution unit 52.

If the tile 4 does not participate in the sync zone associated with the interface 60 shown in FIG. 8A, a control signal reflecting the indication in register 53 that the tile 4 does not participate is received at multiplexer 81 and controls multiplexer 81 to select the inverted form of the internal sync acknowledgment. The interface 60 outputs this inverted form of the internal sync acknowledgment on the sync request wire. Since the inverted form of the internal sync acknowledgment reflects an asserted tile sync request, in this way, when the tile 4 is not participating in the sync zone, the tile sync request for the sync zone is continually asserted, irrespective of the activity of the execution unit 52.

If the tile 4 does participate in the sync zone associated with the interface 60 shown in FIG. 8A, a control signal reflecting the indication in register 53 that the tile 4 does participate is received at the multiplexer 81 and controls multiplexer 81 such that the state of the sync request wire is controlled by the execution unit 52. This execution unit 52 provides a sync signal, and sets this sync signal to high in order to assert a tile sync request and sets the sync signal to low in order to deassert a sync request. The XOR gate 83 is used to provide the tile sync request according to the signalling scheme for signalling sync requests to the sync controller 55. The XOR gate 83 receives the internal sync ack signal and either outputs this sync ack, in the case that the execution unit 52 is not asserting the sync control signal, or outputs an inverted form of the internal sync ack, in the case that the execution unit is asserting the sync control signal. In this way, when the multiplexer 81 is controlled to select the output from the XOR gate 83, the multiplexer 81, and hence the output interface 60, outputs a tile sync request when controlled to do so by the execution unit 52. To issue a tile sync request, the execution unit 52 executes SYNC instructions, which cause the state of the sync request wire output from interface 60 to be set to be the opposite to the current state of the sync acknowledgment wire.

Figure 8B:
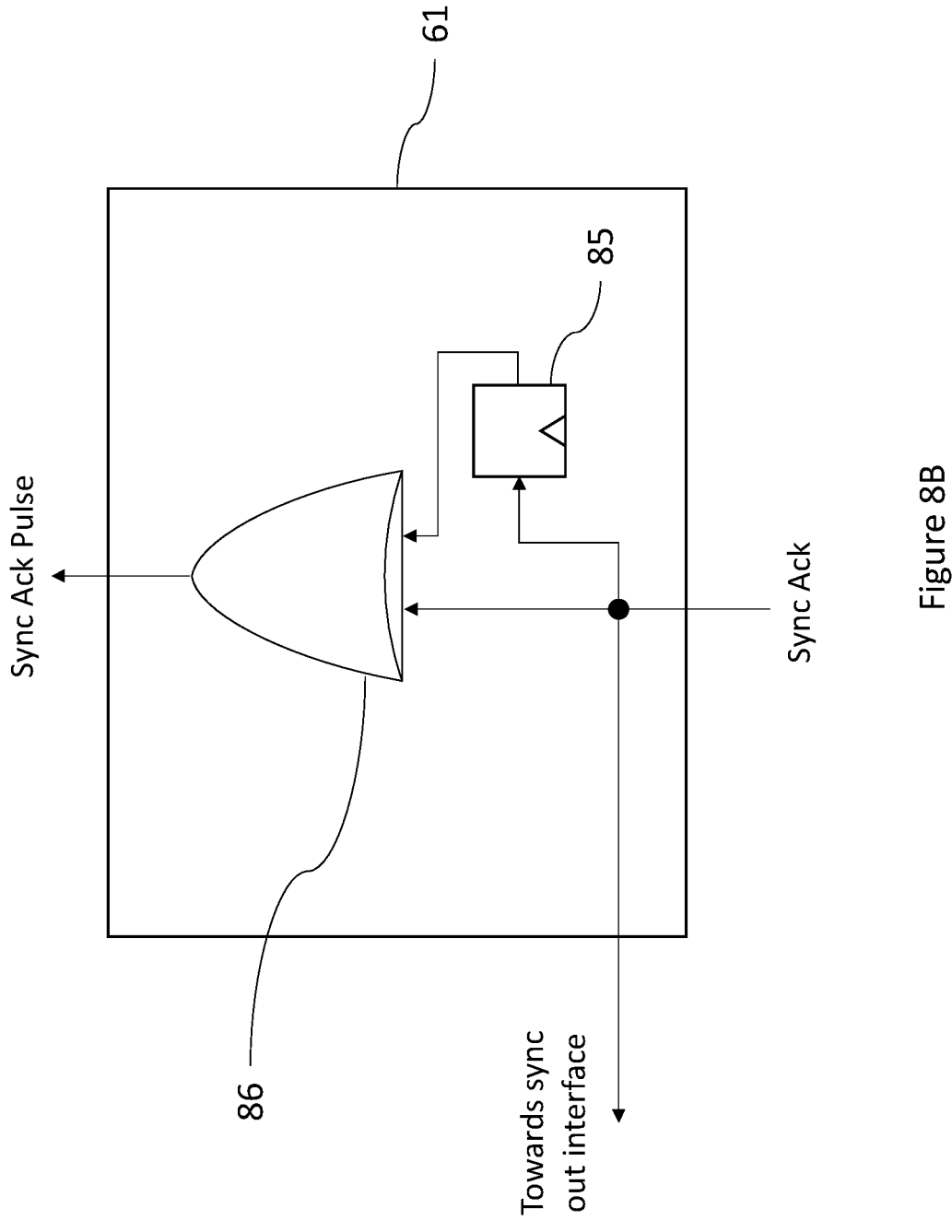
FIG. 8B is a schematic illustration of a sync input interface comprising circuitry for producing a sync ack pulse in response to an edge in the sync acknowledgment signal.

Reference is made to FIG. 8B, which illustrates an example of a sync input interface 61, which receives the internal sync acknowledgement signal and in dependence upon the state of this signal, outputs sync ack pulses to the execution unit 52. The example sync input interface 61 may be associated with any of the sync zones, and each of the sync input interfaces 61 for the different sync zones comprises the same circuitry. The example sync input interface 61 may be associated with the same sync zone as the example sync output interface 60 that is illustrated in FIG. 8A.

The interface 61 comprises a flip flop 85, which stores the state of the internal sync ack signal received at the interface 61. The flip flop 85 outputs this latched state. The interface 61 also comprises an XOR gate 86, which receives the state of the sync ack wire as one input and receives the output of the flip flop 85 as another input. The XOR gate 86 outputs a high signal when these two inputs differ. When the state of the sync ack wire for interface 61 changes, the state of this sync ack wire will temporarily not match the output of the flip flop 85. As a result, the XOR gate 86 receives one high input, and one low input, and as a consequence outputs a high signal. When, after one clock cycle, the state of the flip flop 85 is updated to match the updated state of the sync ack wire, the output of the flip flop 85 will then match the state of the sync ack wire. As a consequence, the XOR gate 86 then outputs a low signal. In this way, the interface 61 provides a pulse (the sync ack pulse) in response to an edge in its received sync ack signal. The sync ack pulse is output from the interface 61 to the execution unit 52. If the execution unit 52, has executed a SYNC instruction for the sync zone corresponding to the sync ack pulse, it stalls whilst waiting for this sync ack pulse. In response to receipt of the sync ack pulse, the execution unit 52 passes the barrier and proceeds to the exchange phase in which data is exchanged between its tile 4 and the other tiles 4. If the execution unit 52 has not executed such a SYNC instruction, but is part of a tile 4 that is indicated in the sync zone register 53 as not participating in the sync zone associated with the sync ack pulse, the execution unit 52 ignores the sync ack pulse.

As is also shown in FIG. 8B, the internal sync ack signal that is received at the interface 61 is also provided to the corresponding sync output interface 60 that is associated with the sync input interface 61. As shown in FIG. 8A, this internal sync ack signal is provided as an input both to the XOR gate 83 and to the inverter 82 and is, in this way, used to provide the tile sync request signal.

Each of the tiles 4 in the processing unit 2a operates similarly to assert tile sync requests in dependence upon the state of its sync acknowledgment wires. Aggregation circuitry is provided in the processing unit 2a for aggregating the tile sync requests output by the tiles 4 to provide an internal sync request that is provided to the sync controller 55. The aggregation circuitry performs such aggregation for each sync zone to provide an aggregate sync request state for each sync zone. The aggregation circuitry is configured to aggregate the state of the tile sync request outputs such that the aggregate signal changes state in response to the tile sync request state of each tile 4 changing state. For example, if the state of each tile's 4 sync request wire for a particular sync zone in the processing unit 2 is set to a low state, the aggregate signal will also be low. The aggregation circuitry causes the aggregate signal to change state to a high state in response to the state of all of the tile sync request wires for the sync zone being set to a high state.

Figure 9:
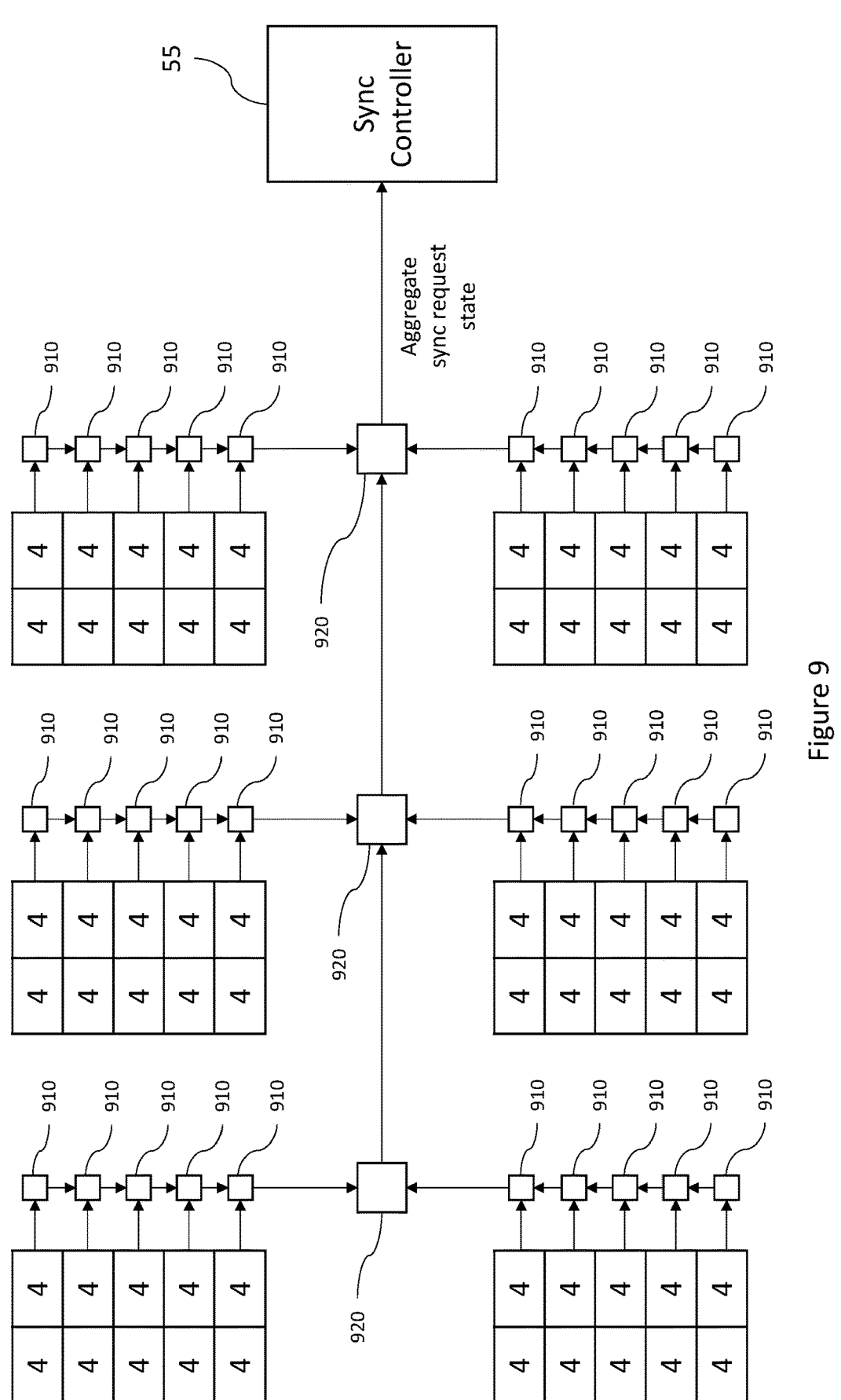
FIG. 9 is a schematic illustration of the sync aggregation circuitry for aggregating sync request state of all tiles of the processing unit for delivery to the sync controller.

Reference is made to FIG. 9, which illustrates an example as to how the tile sync requests are aggregated across the processing unit 2a. As shown, the tiles 4 are arranged in pairs (referred to as 'pair tiles'), with the pairs being arranged in columns. The aggregation circuitry comprises sets of circuitry 910 and circuitry 920. Each of the pair tiles is associated with a set of circuitry 910 that is configured to aggregate the sync request state from its associated tiles 4. Each set of circuitry 910 receives sync request state from upstream in the sync network and aggregates this state with the sync request state output by the associated pair tiles 4. Between the columns, circuitry 920 is configured to receive the aggregated sync request state from the different ones of the columns.

As will be described, the aggregation circuitry 910, 920 is configured to perform the aggregation of sync request state in dependence upon the state of the internal sync acknowledgment signal (which is output by the sync controller 55) for the sync zone.

Figure 10:
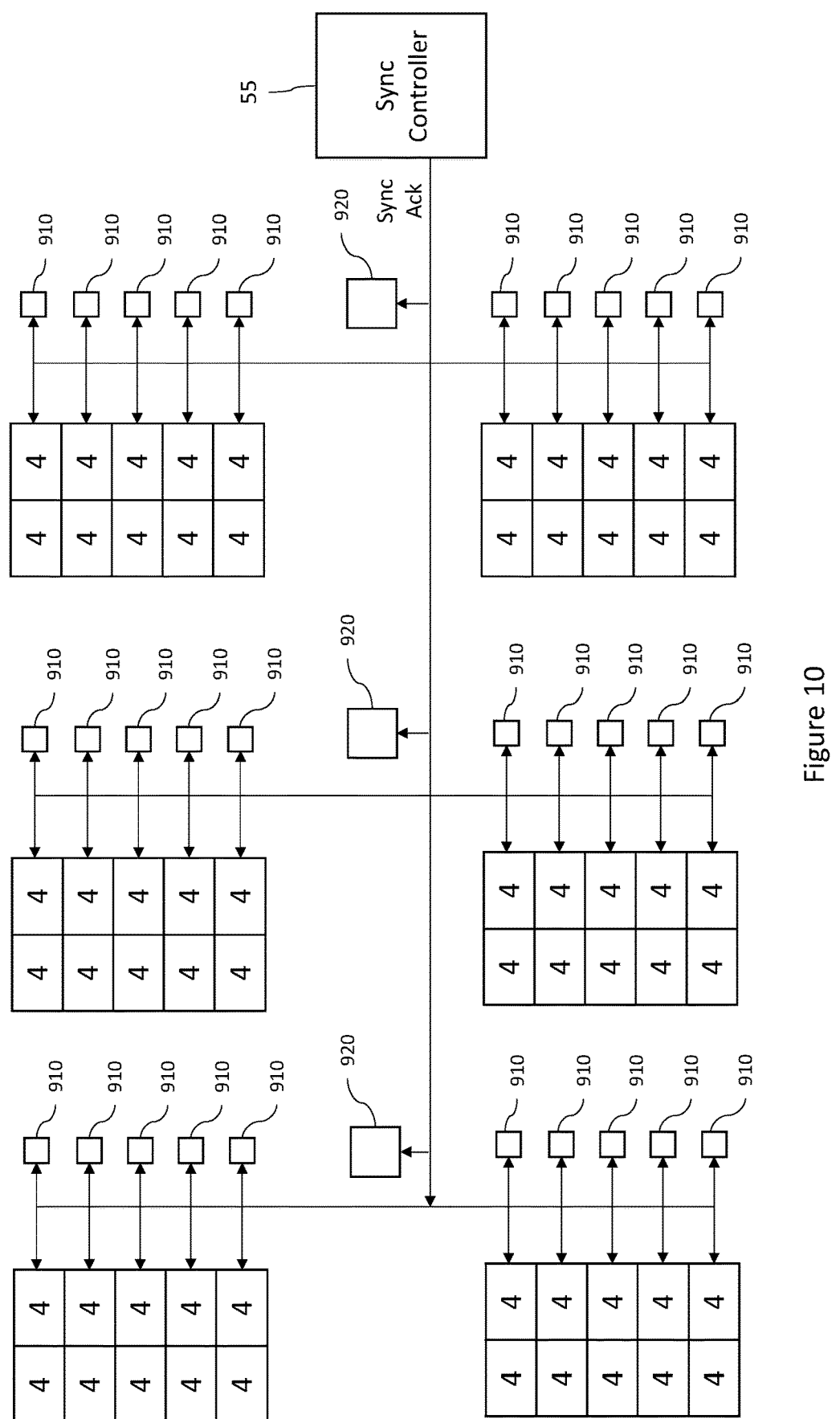
FIG. 10 is a schematic illustration of the sync distribution wiring for delivering a sync acknowledgment signal to all of tiles of the processing unit.

Reference is made to FIG. 10, which illustrates how an internal sync acknowledgment may be distributed to different tiles 4 of the processing unit 2a and to the aggregation circuitry 910, 920. As will be described in more detail, the sync controller 55 changes the state of the internal sync acknowledgment signal in response to receipt of an internal sync request.

As shown, the internal sync acknowledgement signal is provided to all of the tiles 4, the aggregation circuitry 910 and the aggregation circuitry 920. The internal sync acknowledgment signal output by the sync controller 55 is provided with the same state on all of the sync acknowledgment wires used to distribute the signal to the tiles 4 and the circuitry 910, 920.

Figure 11:
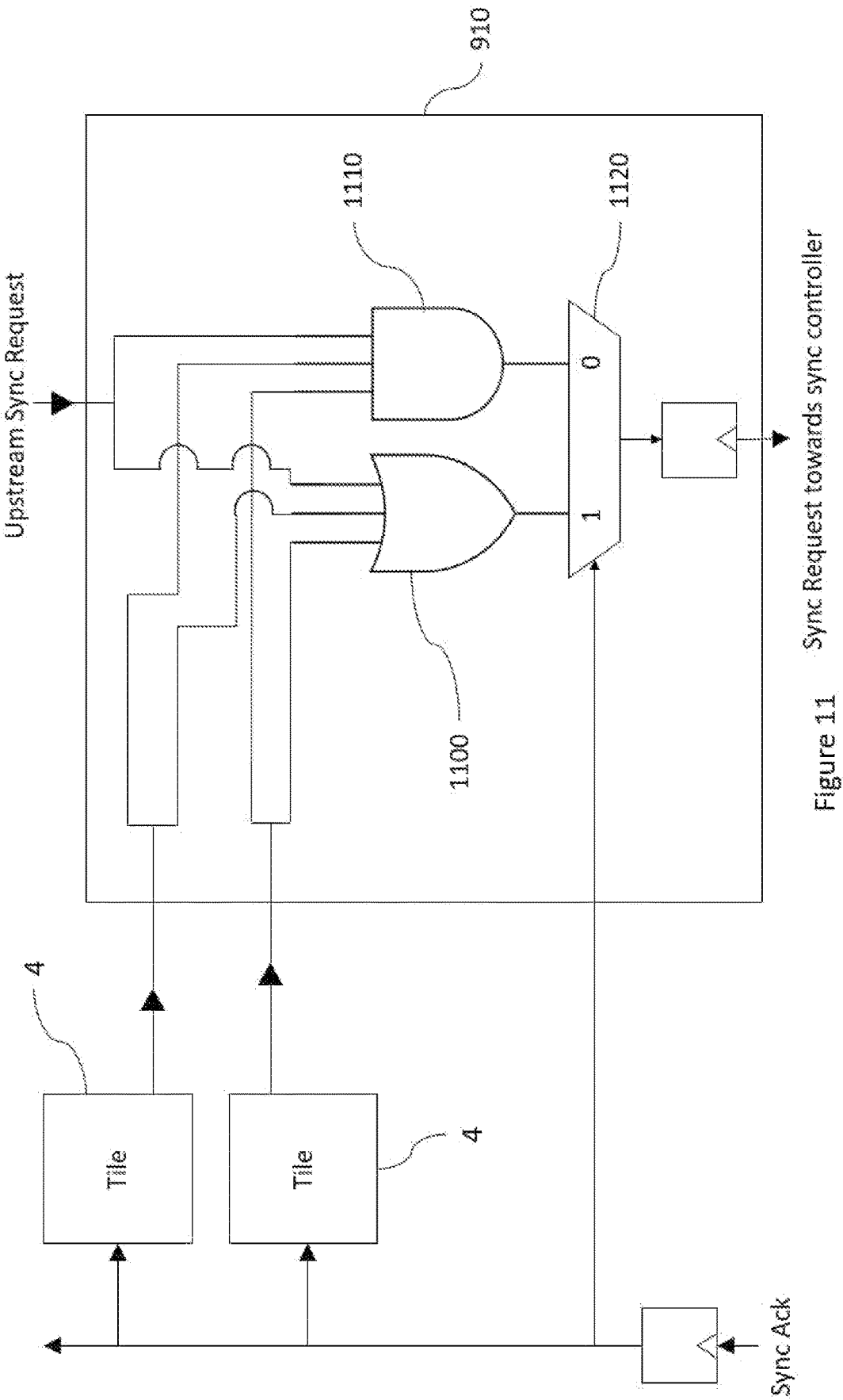
FIG. 11 is a schematic illustration of circuitry for aggregating sync request state output by two pair tiles with upstream sync request state.

Reference is made to FIG. 11, which illustrates an example of aggregation circuitry 910 according to example embodiments. The aggregation circuitry 910 comprises an OR gate 1100, and an AND gate 1110. Each of the gates 1100, 1110 receives sync request state from each of the two pair tiles 4 associated with circuitry 910. Each of the gates 1100, 1110 additionally receives an upstream sync request signal, which reflects aggregated sync request state for tiles 4 further up the relevant column.

The circuitry 910 comprises a multiplexer 1120, which is controlled in dependence upon the internal sync acknowledgment signal to select between the output of the OR gate 1100 and the output of the AND gate 1110. If the internal sync acknowledgment signal is high, the OR gate 1100 is selected, whereas if the internal sync acknowledgment signal is low, the AND gate 1110 is selected. The consequence of this selection is that the circuitry 910 only outputs a signal that is opposite to the internal sync acknowledgment signal if all of the tile sync request signals (i.e. the signals from both tiles 4 and the upstream sync request signal) received at circuitry 910 have the opposite state to the internal sync acknowledgment signal. For instance, if the internal sync acknowledgment signal is high, the OR gate 1100 is selected, and so the tile sync request state output by circuitry 910 will also be high unless all inputs to the OR gate 1100 are low. On the other hand, if the internal sync acknowledgment signal is low, the AND gate 1110 is selected, and so the tile sync request state output by circuitry 910 will also be low, unless all inputs to the AND gate 1110 are high.

Multiple instances of circuitry 910 are chained together to provide aggregate sync request state for a column.

Figure 12:
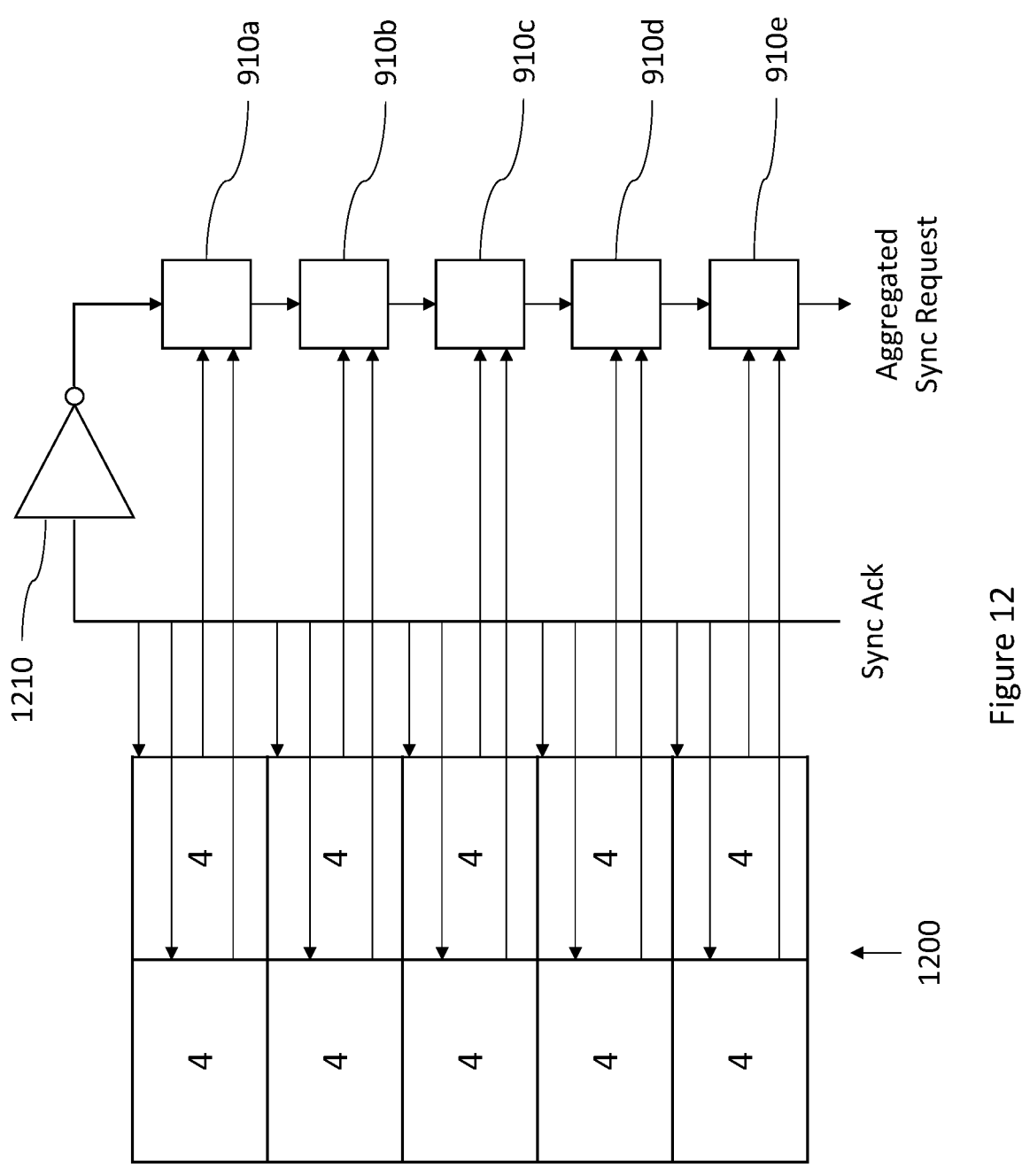
FIG. 12 is a schematic illustration of circuitry for aggregating sync request state for a column of tiles.

Reference is made to FIG. 12, which illustrates how the aggregate sync request state may be provided for a column 1200 of tiles 4. Each of the sets of circuitry 910b-e is configured to, as shown in FIG. 11, receive the tile sync request state output by its associated tiles 4, and additionally receive the aggregate sync request state (also referred to as the upstream sync request state) provided by the adjacent set of circuitry 910. For example, circuitry 910b receives the upstream sync request state output by circuitry 910a, circuitry 910c receives the upstream sync request state output by circuitry 910b, and so on. Since circuitry 910a is located at the top of the column 1200, with no further aggregation circuitry 910 located above, the circuitry 910a receives as its upstream sync request state, the output of invertor 1210. The invertor 1210 inverts the sync acknowledgment signal and in so doing provides as its output, an asserted sync request signal. Each of the sets of circuitry 910a-e will output an asserted sync request once it receives an asserted tile sync request from its associated tiles 4 and an asserted sync request from higher in the column 1200. In this way, once all of the tiles 4 also provide an asserted sync request signal, the aggregate output by the circuitry 910*e* will also be the same asserted sync request signal.

Figure 13:
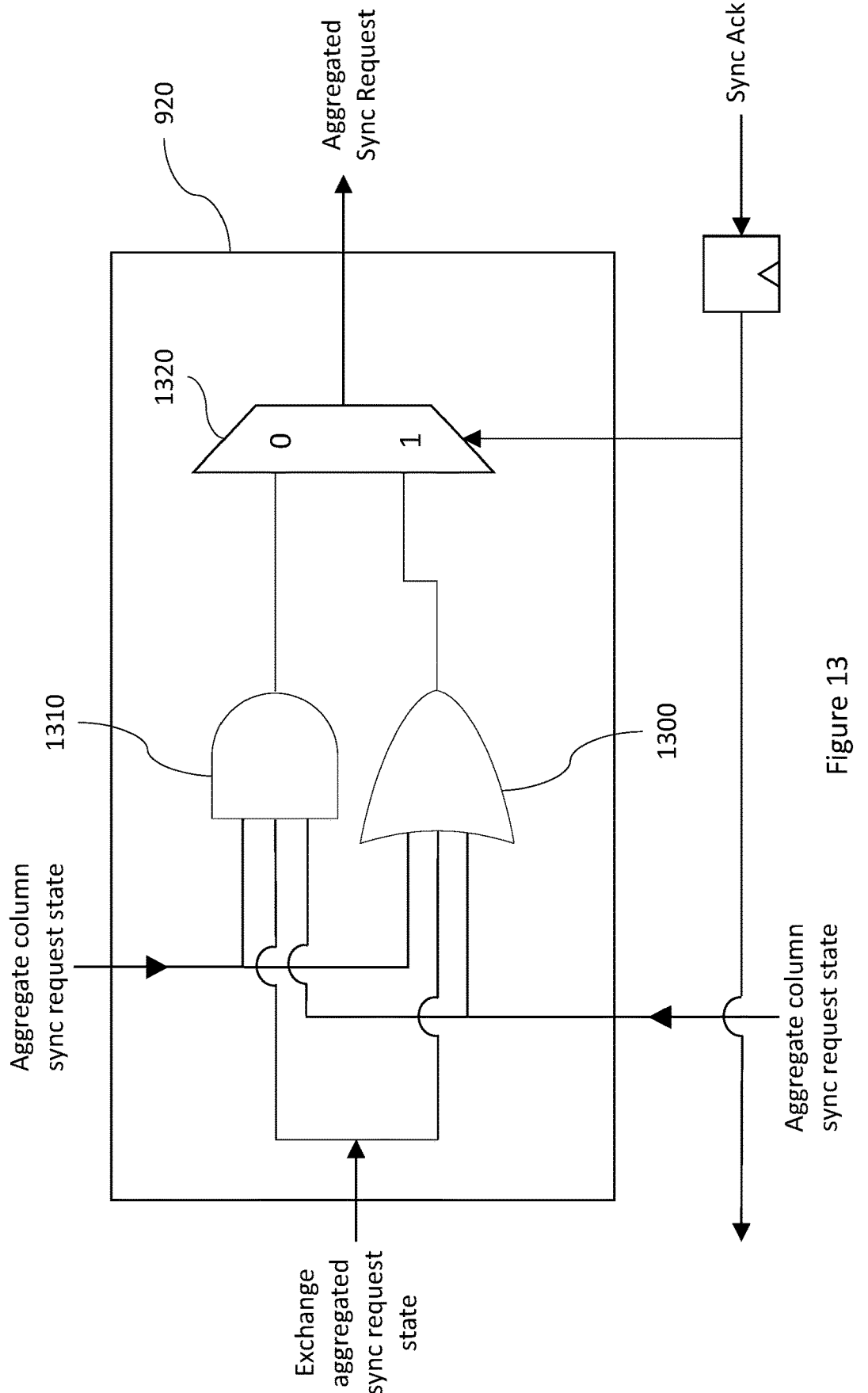
FIG. 13 is a schematic illustration of circuitry for aggregating sync request state from multiple columns of tiles.

Reference is made to FIG. 13, which illustrates an example of the aggregation circuitry 920, and shows how the circuitry 920 aggregates the sync request state of different columns. As with the circuitry 910, the circuitry 920 includes an OR gate 1300 and an AND gate 1310. Both the AND gate 1310 and the OR gate 1300 receive as inputs, the aggregated sync request state from two of the columns, and further aggregated sync request state. The further aggregated sync request state is shown in FIG. 13 as "Exchange aggregated sync request state" since the state is aggregated in the direction of the data exchange wiring, which runs perpendicular to the columns. The exchange aggregated sync request state may be output by a further instance of the circuitry 920 that is upstream in the sync network or, if there are no further instances of the circuitry 920 that are upstream, may be provided by an inverted form of the internal sync acknowledgment signal.

The circuitry 920 comprises a multiplexer 1320, which is controlled in dependence upon the internal sync acknowledgment signal to select between the output of the OR gate 1300 and the output of the AND gate 1310. If the internal sync acknowledgment signal is high, the OR gate 1300 is selected, whereas if the internal sync acknowledgment signal is low, the AND gate 1310 is selected. The consequence of this selection is that the circuitry 920 only outputs a signal that is opposite to the internal sync acknowledgment signal if all of the aggregate sync request state (i.e. the aggregate sync request state from both associated columns and the exchange aggregated sync request state) received at circuitry 920 have the opposite state to the internal sync acknowledgment signal. For instance, if the internal sync acknowledgment signal is high, the OR gate 1300 is selected, and so the aggregate sync request state output by circuitry 920 will also be high unless all inputs to the OR gate 1300 are low. On the other hand, if the internal sync acknowledgment signal is low, the AND gate 1310 is selected, and so the aggregate sync request state output by circuitry 920 will also be low, unless all inputs to the AND gate 1310 are high.

Multiple instances of circuitry 920 are chained together to provide aggregate sync request state for the processing unit 2*a*. The consequence of the aggregation performed by the instances of the circuitry 910 and the instances of the circuitry 920 is that the aggregate sync request state that is provided represents an internal sync request when all of the tiles 4 have set their sync request output signal appropriately.

Figure 14A:
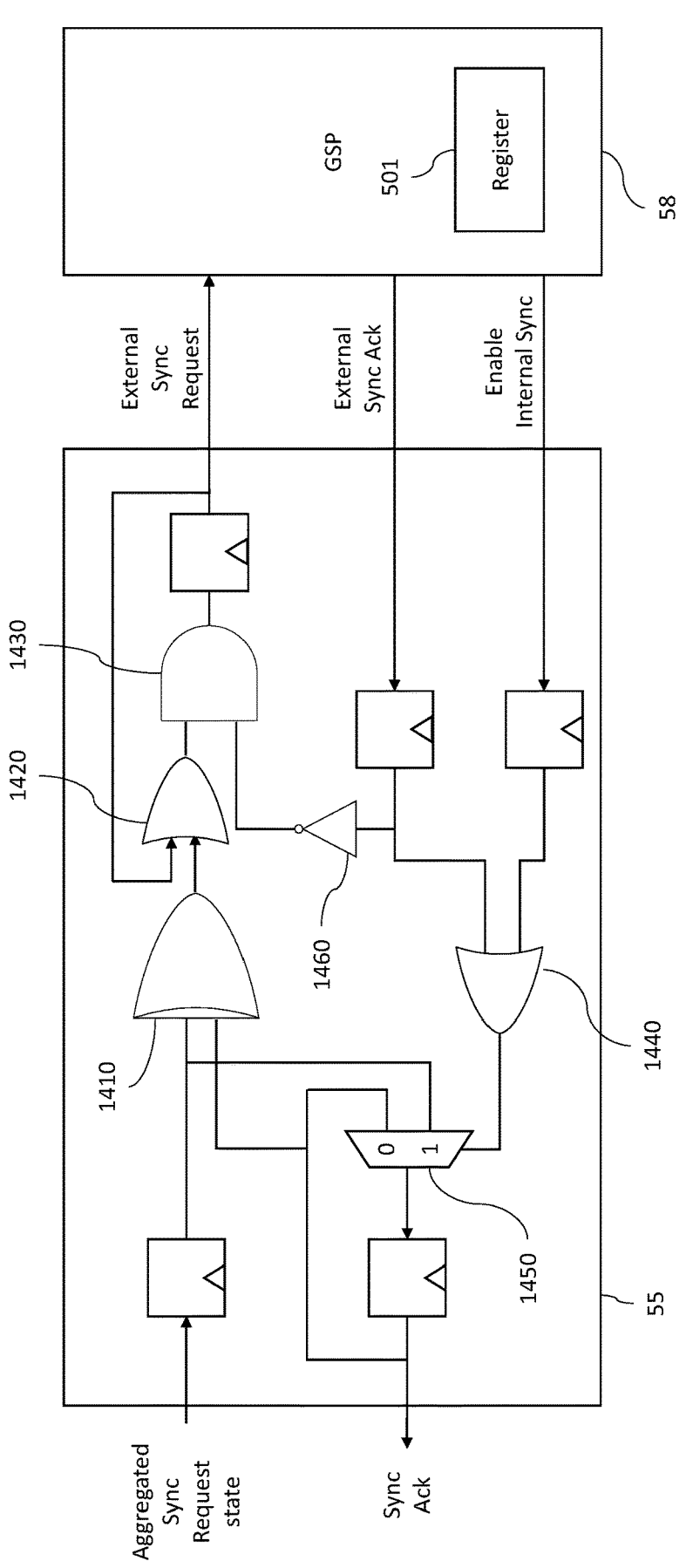
FIG. 14A is a schematic illustration of circuitry within a sync controller for providing a sync acknowledgment in response to receipt of a sync request for the processing unit.

Reference is made to FIG. 14A, which illustrates circuitry within the sync controller 55. FIG. 14A shows the circuitry provided in sync controller 55 that is associated with a single sync zone. However, it would be appreciated that sync controller 55 comprises a separate instance of such circuitry for each sync zone. The circuitry within the sync controller 55 provides an internal sync ack in response to receipt of an internal sync request. The circuitry of the sync controller 55 also communicates with the GSP 58 to send and receive external sync request and acknowledgment signals. The external sync request and acknowledgment signals are provided according to an alternative sync signalling scheme, which is described in more detail with reference to FIG. 14B.

A register 501 is provided in the GSP 58 and indicates for each of the sync zones supported for the processing unit 2*a*, which of those zones is configured as being internal (includ-ing only tiles 4 of the processing unit 2*a*) and which is configured as being external (also including tiles 4 of other processing units 2).

If the sync zone for which circuitry is shown in FIG. 14A is configured as internal, a signal indicating as such (shown as the 'enable internal sync' signal) is provided by circuitry of the GSP 58 to the OR gate 1440. Consequently, the OR gate 1440 outputs a high signal to the multiplexer 1450. The signal is used to control the multiplexer 1450 to output the internal sync request state (i.e. the aggregate sync request state received at the controller 55). The internal sync ack state is consequently set to be the same as the internal sync request state. In this way, when the sync zone is configured to be internal, the sync controller 55 immediately acknowl-edges the internal sync request by setting the internal sync acknowledgment state to be the same as the internal sync request state.

If the sync zone for which circuitry is shown in FIG. 14A is configured as external, the enable internal sync signal is set low and, therefore, the output of the OR gate 1440 will be set to be low until the GSP 58 provides an external sync acknowledgment signal. Before the external sync acknowl-edgment is received from the GSP 58, the sync controller 55 provides an external sync request to the GSP 58.

Figure 14B:
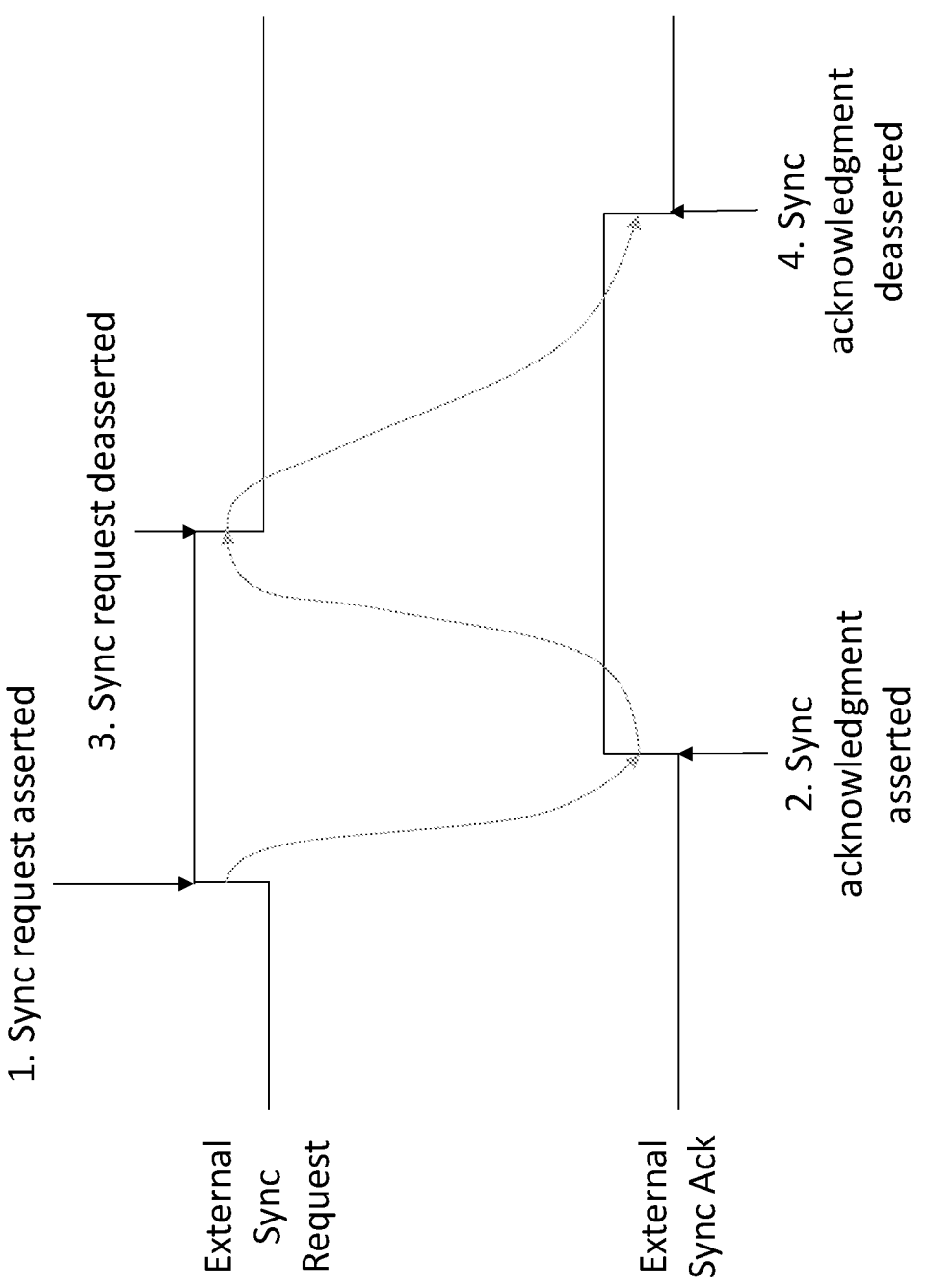
FIG. 14B is a schematic illustration of a sync signalling scheme used for signalling external sync request and acknowledgements.

The external sync requests and sync acknowledgments are represented according to a different sync scheme to the scheme (exemplified in FIG. 7) that is used for the tile sync requests and acknowledgments and for the internal sync request and acknowledgments. Reference is made to FIG. 14B, which illustrates the scheme for signalling external sync requests and acknowledgments. This Figure illustrates an example of a sync handshake between a downstream propagation node and an upstream propagation node in the sync network. The downstream propagation node may, for example, be the GSP 58 on one chip 500, whilst the upstream propagation node is the GSP 58 on another chip 500.

FIG. 14B illustrates the state of an external sync request signal and the state of an external sync acknowledgment signal. These are each provided on separate wires and so the state of the signals reflect the state of the wires. At the start of the sync handshake, the downstream propagation node provides an external sync request (shown as 1. sync request asserted) by setting the external sync request signal to be high. This causes an external sync request to be detected at the upstream propagation node. The downstream propaga-tion node will keep the external sync request asserted until it receives an external sync acknowledgment. In effect, the downstream propagation node stalls until it receives the external sync acknowledgment. The upstream propagation node, in response to the external sync request, provides an external sync acknowledgment (shown as 2. sync acknowl-edgment asserted) by setting the external sync acknowledg-ment signal to be high. This causes an external sync acknowledgment to be detected at the downstream propa-gation node. The downstream propagation node, in response to the external sync acknowledgment, deasserts the external sync request (shown as 3. sync request deasserted) by setting the external sync request signal low. The upstream propa-gation node detects that the sync request signal has been deasserted and, in response to the deassertion of the sync request signal, deasserts the external sync acknowledgment (shown as 4. sync acknowledgment deasserted) by setting the state of the external sync acknowledgment signal to be low. With the external sync acknowledgment signal deas-serted, the sync handshake between the two nodes of the sync network is then complete.

The sync controller 55 comprises circuitry for converting an internal sync request to an external sync request and for converting the external sync acknowledgment to an internal sync acknowledgement. The circuitry comprises a XOR gate 1410, which is part of the circuitry for generating the external sync request from an internal sync request. The XOR gate 1410 receives as one input, the aggregate sync request state of the processing unit 2a, and as another input, the current state of the internal sync ack signal. The XOR gate 1410 outputs a high signal (indicating a sync request) if there is a mismatch between this aggregate sync request state and the sync ack state. Such a mismatch is indictive that a tile sync request has been asserted by all of the tiles 4 of the processing unit 2a. When a high signal is output from the XOR gate 1410, this is provided to the OR gate 1420, which responds by also issuing a high signal, which is provided to the AND gate 1430. The AND gate 1430 receives as one input, the output of OR gate 1420, and as another input the inverted state of the external sync acknowledgment signal. The AND gate 1430, therefore, only outputs a high signal if the external sync acknowledgment signal is currently low (indicating that the external sync acknowledgment is not currently asserted). The output of the AND gate 1430 provides the external sync request signal to the GSP 58.

As described in more detail with respect to FIG. 17 below, the GSP 58 is configured to exchange external sync requests and acknowledgments with additional GSPs 58 in the system 550. Following this process, the GSP 58 provides the external sync ack signal, which is provided to invertor 1460 and the OR gate 1440. The invertor 1460 inverts the external sync ack signal (which is now set high) to produce a low signal, which is provided to the AND gate 1430. In response, the AND gate 1430 outputs a low signal, causing the external sync request to be deasserted. The OR gate 1440 provides a high output to the multiplexer 1450. This signal is used to control the multiplexer 1450 such that the internal sync request state is output from the multiplexer 1450. Therefore, in response to the external sync ack signal, the multiplexer 1450 is controlled to set the internal sync ack state to be the same as the internal sync request state, thus causing an internal sync acknowledgement to be sent to the tiles 4.

Figure 15:
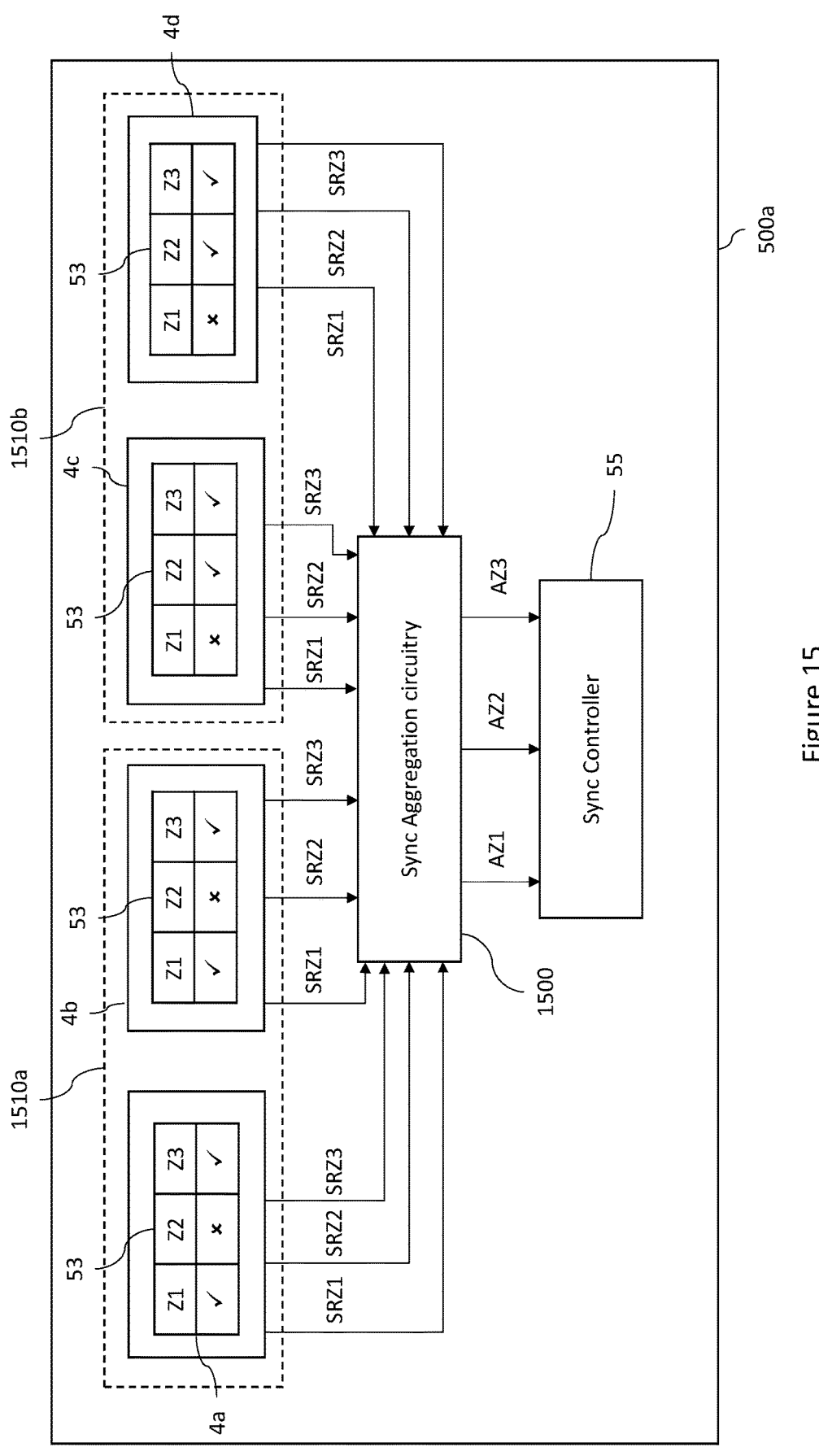
FIG. 15 is a schematic illustration of the division of tiles of a processing unit between different sync zones and the transmission of sync requests by the tiles of those zones.

Reference is made to FIG. 15, which illustrates how different groupings of tiles 4 may be subscribed to three different sync zones. FIG. 15 shows the indications in each of registers 53 for these three sync zones. As shown, the registers 53 for tile 4a and tile 4b belong to a first sync zone (labelled as 'Z1') and to a third sync zone (labelled as 'Z3'), but do not belong to a second sync zone (labelled as 'Z2'). Also, as shown, the registers 53 for tile 4c and 4d belong to the second sync zone (labelled as 'Z2') and to the third sync zone (labelled as 'Z3'), but do not belong to a first sync zone (labelled as 'Z1'). The sync aggregation circuitry 1500 shown in FIG. 15 may comprise the aggregation circuitry 910 and 920 discussed above.

Although in practice, more than two tiles 4 of the processing unit 2 would likely participate in each sync zone, in FIG. 15, Z1 is shown as including a group 1510a of two tiles 4a, 4b and Z2 is shown as including a group 1510b of two tiles 4c, 4d.

Since tiles 4c and 4d do not belong to Z1, these tiles 4c, 4d continually assert a tile sync request on their sync request wires associated with Z1. These sync requests are shown in FIG. 15 as SRZ1. As discussed above, in embodiments, the assertion of a tile sync request is represented by setting the state of the relevant sync request wire to be opposite to the state of the relevant sync acknowledgment wire.

Since tiles 4a and 4b do belong to Z1, these tiles 4a, 4b only assert a tile sync request on their sync request wire for Z1 when they reach a barrier synchronisation that is associated with Z1 in their compiled code set. At this point, the execution unit 52 of the respective tile 4a, 4b executes a SYNC instruction taking an indication of Z1 as an operand, which causes a tile sync request to be asserted on the sync request wire of the tile 4 that is associated with Z1.

Once the tiles 4a, 4b belonging to Z1 have reached the barrier synchronisation, all of the tiles 4 (including those not belonging to Z1) in the processing unit 2a are asserting a tile sync request for Z1. The sync aggregation circuitry 1500 aggregates the tile sync requests to provide the internal sync request (shown as AZ1) for Z1 to the sync controller 55.

Figure 16:
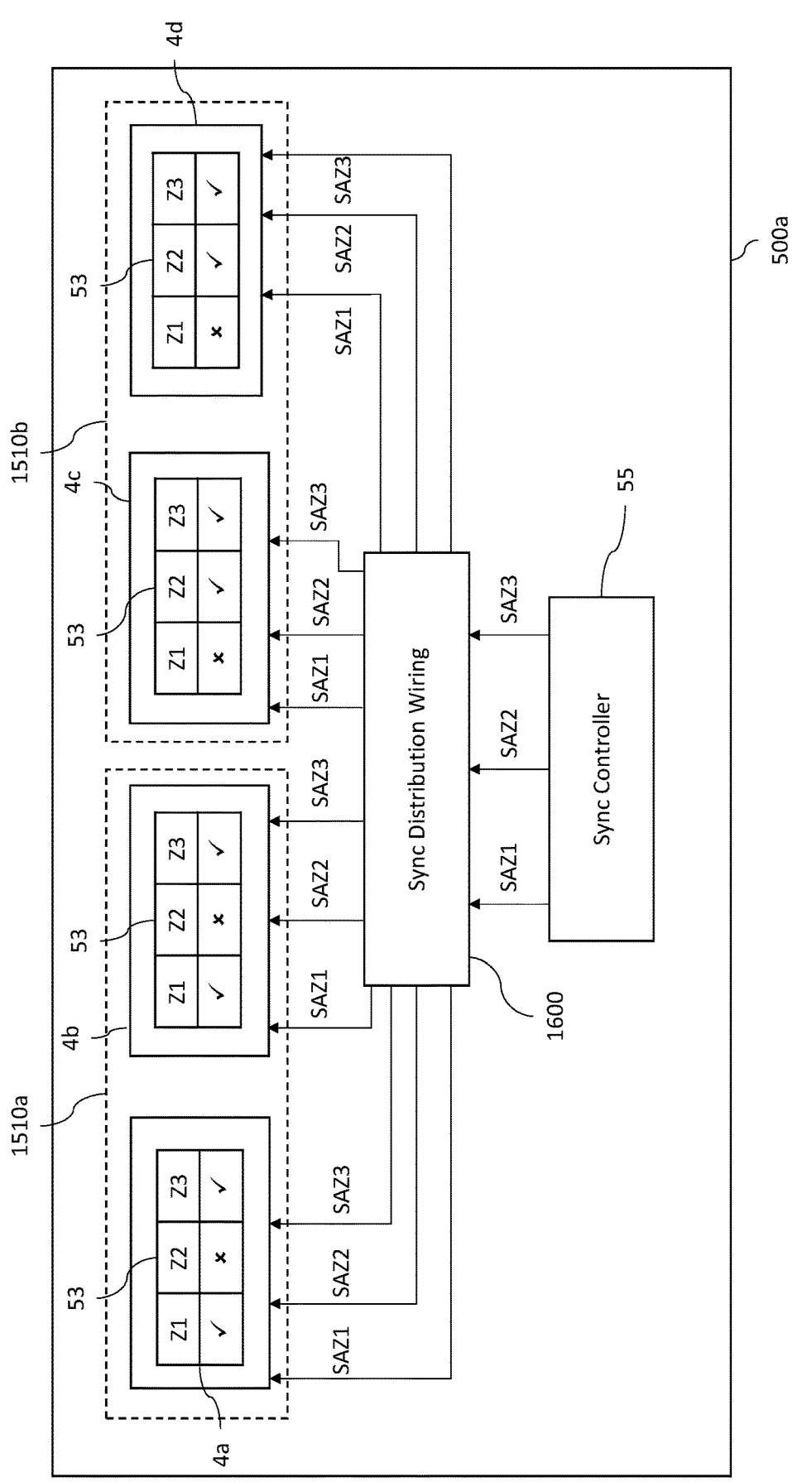
FIG. 16 is a schematic illustration of the division of tiles of a processing unit between different sync zones and the delivery of sync acknowledgments to the tiles of those zones.

Reference is made to FIG. 16, which illustrates how internal sync acknowledgments are returned to the tiles 4. The sync distribution wiring shown in FIG. 16 may comprise the wiring shown in FIG. 10 for providing internal sync acknowledgments to the tiles 4. In response to the receipt of AZ1, the sync controller 55 asserts an internal sync acknowledgment signal (shown as SAZ1) that is associated with Z1. SAZ1 is provided by sync distribution wiring 1600 to each of the tiles 4a-d. In response to receipt of this internal sync acknowledgment signal, the execution units 52 of tiles 4a,4b pass the barrier synchronisation and proceed to the exchange phase. If the exchange phase is an internal exchange phase, one or more of the execution units 52 of tiles 4a, 4b execute instructions to exchange data between tiles 4a, 4b. If the exchange phase is an external exchange phase, one or more of the execution units 52 of tiles 4a, 4b execute instructions to exchange data with devices external to the device 500a.

When SRZ1 is received at the tiles 4c, 4d not belonging to Z1, the execution units 52 of these tiles 4c, 4d take no action in response to SRZ1 and continue to operate asynchronously to the compute and exchange cycle for Z1.

Referring back to FIG. 15, the situation with Z2 is considered. Since tiles 4a and 4b do not belong to Z2, these tiles 4a, 4b continually assert a tile sync request on their sync request wire associated with Z2. This sync request is shown in FIG. 15 as SRZ2.

Since tiles 4c and 4d do belong to Z2, these tiles 4a, 4b only assert a tile sync request on their sync request wire for Z2 when they reach a barrier synchronisation that is associated with Z2 in their compiled code set. At this point, the execution units 52 of the tiles 4c, 4d each execute a SYNC instruction taking an indication of Z2 as an operand. Each such SYNC instruction causes the logic in the respective tile 4 to assert an internal sync request on its sync request wire for Z2.

Once the tiles 4c, 4d belonging to Z2 have reached the barrier synchronisation, all of the tiles 4 (including those not belonging to Z2) in the processing unit 2a are asserting a tile sync request for Z2. The sync aggregation circuitry 1500 provides the aggregated sync request (shown as AZ2) for Z2 to the sync controller 55.

Reference is again made to FIG. 16, which illustrates how sync acknowledgments for the Z2 sync are returned to the tiles 4. In response to receipt of AZ2, the sync controller 55 asserts an internal sync acknowledgment signal (shown as SAZ2) that is associated with Z2. SAZ2 is provided by sync distribution wiring 1600 to each of the tiles 4a-d. In response to receipt of this sync acknowledgment signal, the execution units 52 of tiles 4c,4d pass the barrier synchronisation and proceed to the exchange phase. If the exchange phase is an internal exchange phase, one or more of the execution units 52 of tiles 4c,4d execute instructions to exchange data between tiles 4*c*,4*d*. If the exchange phase is an external exchange phase, one or more of the execution units 52 of tiles 4*c*,4*d* execute instructions to exchange data with devices external to the device 500*a*.

Referring back to FIG. 15, the situation with Z3 is considered. As shown, in each of the tiles 4*a-d* of the processing unit 2*a*, the respective register 53 indicates that the tile 4 belongs to Z3. As a result, each of the tiles 4*a-d* issues a tile sync request when it reaches a barrier synchronisation associated with Z3. Upon reaching this barrier, the execution unit 52 of each tile 4 executes a SYNC instruction taking an indication of Z3 as an operand, thus causing a tile sync request to be issued on the sync request wire of the respective tile 4. The sync aggregation circuitry 1500 aggregates the state of the sync request wires and provides an internal sync request (AZ3) to the sync controller 55. As shown in FIG. 16, in response to receipt of AZ3, the sync controller 55 causes an internal sync acknowledgment to be returned to each of the tiles 4*a-d* in the processing unit 2*a*. The sync distribution wiring 1600 causes the internal sync acknowledgment signal to be asserted on the sync acknowledgment wires associated with Z3. Since all of these tiles 4*a-d* belong to Z3, in response to the internal sync acknowledgment, the execution unit 52 of each tile 4*a-d* passes the barrier synchronisation and enters the exchange phase (which may be an internal or an external exchange phase).

As noted above, the sync controller 55 will, if the sync zone for which an internal sync request is received is configured as an internal sync zone, acknowledge the sync request without providing an external sync request to the GSP 58. However, if the sync zone is configured as an external sync zone, the sync controller 55 will forward the external sync request to the GSP 58 and await receipt of an external sync acknowledgment from the GSP 58 before forwarding the internal sync acknowledgment to the tiles 4. The GSP 58 itself contains different configuration settings that indicate how external sync requests should be propagate for different external sync zones.

Figure 19:
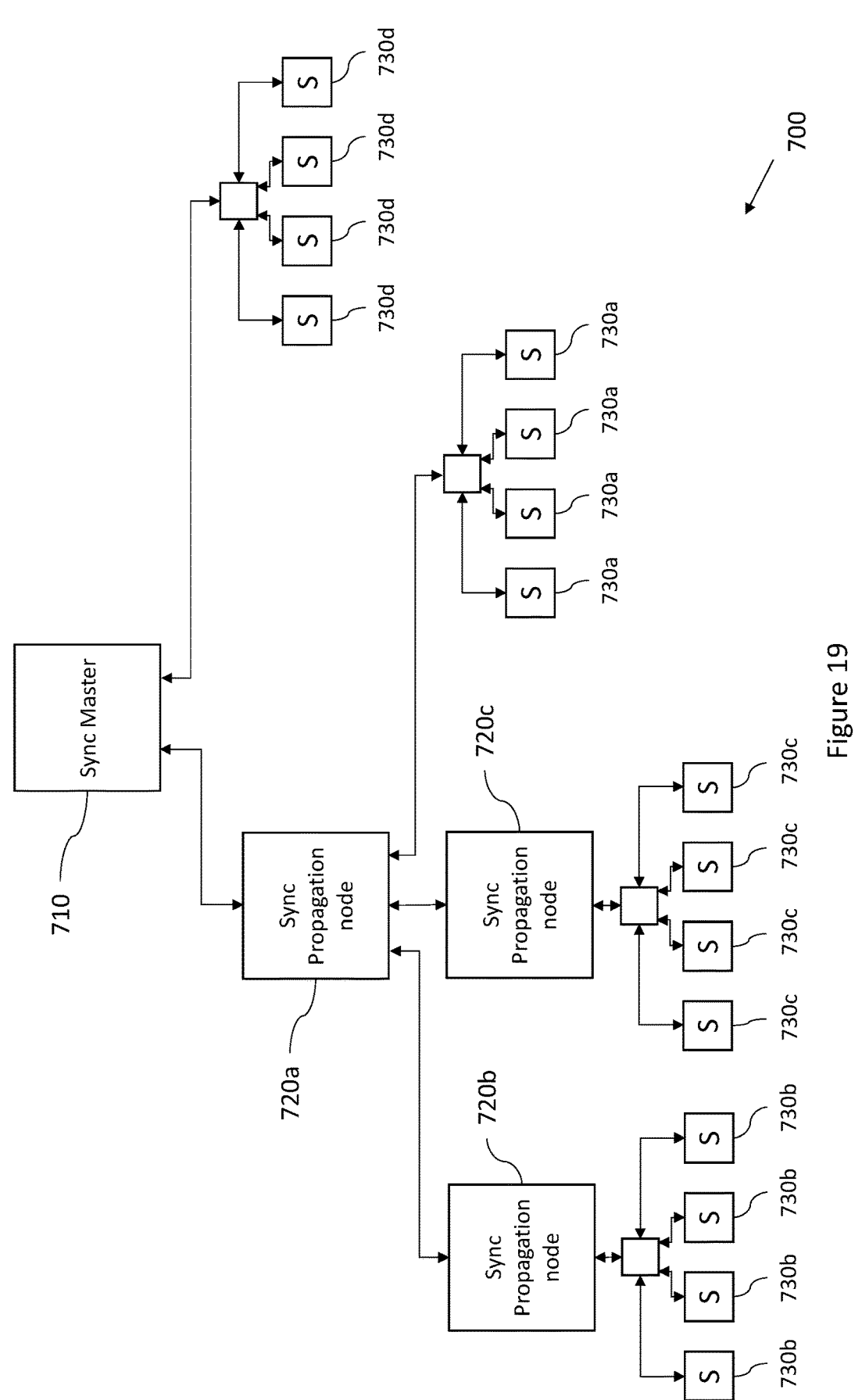
FIG. 19 is an illustration of an example sync network.

To illustrate the concept of a sync network comprising sync master nodes, sync propagation nodes, and slave nodes, reference is made to FIG. 19, which illustrates an example sync network 700 for a sync zone. The sync network 700 includes a sync master 710 and multiple sync propagation nodes 720*a*, 720*b*, 720*c*. In example embodiments, each of the sync master 710 and the sync propagation nodes 720*a*, 720*b*, 720*c* is a GSP 58. The sync network 700 further comprises a plurality of sets of slave nodes 730*a*, 730*b*, 730*c*, 730*d* from which sync requests originate. The slave nodes 730*a*, 730*b*, 730*c*, 730*d* together form a sync group defined for the sync network 700. In the embodiments described herein, the tiles 4 function as the slave nodes for a barrier sync, and the sync requests which originate from those slave nodes are the tile sync requests discussed above. The slave nodes are divided into different sets. For example, there is a first set of slave nodes 730*a*, a second set of slave nodes 730*b*, a third set of slave nodes 730*c*, and a fourth set of slave nodes 730*d*. In these embodiments, each of the sets of slave nodes 730*a*, 730*b*, 730*c*, 730*d* are tiles 4 of a different processing unit 2*a*. Each slave nodes issues a sync request upstream in the sync network 700. The sync requests from a group of slave nodes are aggregated and provided to a node higher in the sync network.

As shown in FIG. 19, each of the sync master 710 and the sync propagation nodes 720*a*, 720*b*, 720*c* has an associated downstream set of slave nodes from which it receives an aggregated sync request for each barrier sync. For example, sync propagation node 720*a* is associated with the first set of slave nodes 730*a*. In embodiments in which the sync master 710 and sync propagation nodes 720*a*, 720*b*, 720*c* are GSPs 58, each of the sets of slave nodes are tiles 4 on the same chip 500 as their associated GSP 58.

Sync propagation nodes 720*b*, 720*c* receive aggregated sync requests originating from their associated slave nodes 730*b*, 730*c*, but do not receive sync requests from other sync propagation nodes. In response to receipt of a sync request originating from its associated slave nodes 730*b*, 730*c*, each sync propagation node 720*b*, 720*c* propagates a sync request upstream in the sync network 700 to sync propagation node 720*a*.

Sync propagation node 720*a* waits until it receives a sync request from each of its downstream nodes. These downstream nodes comprise the sync propagation nodes 720*b*, 720*c* and the set of slave nodes 730*a* associated with sync propagation node 720*a*. When sync propagation node 720*a* has received all of the sync requests from each of its downstream nodes, it issues a sync request to the sync master 710.

The sync master 710 waits until it receives a sync request from each of its downstream nodes. These downstream nodes comprise the sync propagation node 720*a* and the set of slave nodes 730*d* associated with the sync master 710. When the sync master 710 has received all of the sync requests from each of its downstream nodes, it issues sync acknowledgments back to the sync propagation node 720*a* and to the slave nodes 730*d*.

The sync propagation node 720*a*, upon receiving a sync acknowledgment from the sync master 710, issues sync acknowledgments to each of the downstream sync propagation nodes 720*b*, 720*c* and to its associated slave nodes 730*a*. Likewise, the sync propagation nodes 720*b*, 720*c*, in response to receipt of these sync acknowledgments, each issue sync acknowledgments to their associated slave nodes 730*b*, 730*c*. All of the slave nodes 730*a-d* of the sync network 700, in response to receipt of the sync acknowledgments, pass the barrier synchronisation and exchange data during the exchange phase.

The example in FIG. 19 shows a specific arrangement of a sync network 700 in which the sync master 710 receives a sync request from only one downstream sync propagation node 720*a*. However, in other examples, the sync master 710 may receive sync requests from more than one downstream sync propagation node. Similarly, although the example sync propagation node 720*a* receives sync requests from two downstream sync propagation nodes 720*b*, 720*c*, alternatively it may receive sync requests from a different number of downstream sync propagation nodes.

Figure 17:
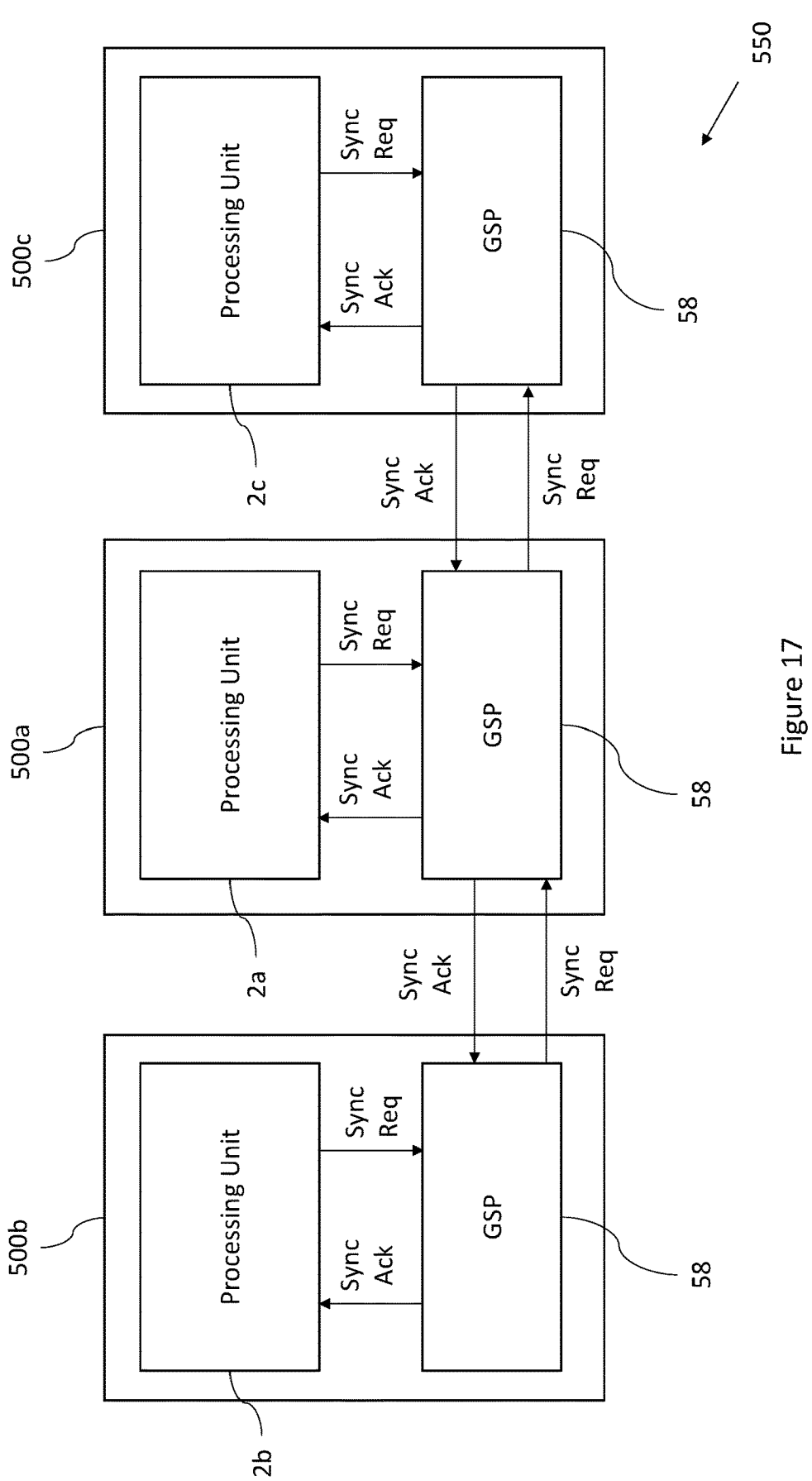
FIG. 17 is a schematic illustration of the exchange of sync requests and acknowledgments between GSPs in the system.

Reference is made to FIG. 17, which illustrates a system 550 comprising a plurality of devices 500*a-c*. FIG. 17 shows how the GSPs 58 of these devices 500*a-c* exchange external sync requests and external sync acknowledgments at an external barrier synchronisation.

Each processing unit 2*a-c* issues an external sync request to its associated GSP 58. Such an external sync request is issued by the sync controller 55 of the processing unit 2 when that sync controller 55 receives aggregate sync request state (i.e. an internal sync request) indicating that each of the tiles 4 of its processing unit 2 has issued a tile sync request. Each of the internal sync requests shown in FIG. 17 as being sent by the sync controller 55 to the GSP 58 is associated with the same sync zone.

Each GSP 58 stores configuration settings for different sync zones indicating how it will respond to received external sync requests from those zones. These configuration settings indicate which interfaces of the GSP 58 are enabled for particular sync zones and the directionality (i.e. whether sync requests are sent or received on those interfaces) for the enabled interfaces. In the example of FIG. 17, the GSP 58 of device 500b is configured to, in response to receipt of the external sync request from the sync controller 55 of processing unit 2b, propagate the external sync request upstream to GSP 58 of device 500a. The GSP 58 of device 500a is configured to, in response to receipt of both the external sync request from the sync controller 55 of processing unit 2a and the external sync request from the GSP 58 of device 500b, propagate an external sync request upstream to GSP 58 of device 500c. The GSPs 58 of devices 500a and 500b, therefore, both acts as intermediate nodes (i.e. propagation nodes) in the sync network. The GSP 58 of device 500c is configured to receive the external sync request from GSP 58 of device 500a and an external sync request from the sync controller 55 of device 500c. In response to receipt of these external sync requests, the GSP 58 of device 500c issues an external sync acknowledgment to the sync controller 55 of device 500c and an external sync acknowledgment to the GSP 58 of device 500a. The GSP 58 of device 500c, therefore, acts as the master node for the sync network. In response to receipt of the external sync acknowledgment, the GSP 58 of device 500a issues external sync acknowledgments to the sync controller 55 of device 500a and to the GSP 58 of device 500b. In response to receipt of the external sync acknowledgment from the GSP 58 of device 500a, the GSP 58 of device 500b issues an external sync acknowledgement to the sync controller 55 of device 500b. Each of the sync controllers 55 of the devices 500a-c, in response to receipt of the respective sync acknowledgments, issues sync acknowledgment to all of the tiles 4 of its respective processing unit 2-c, as described above with respect to FIG. 14A. The tiles 4 belonging to the sync zone (as indicated in their sync zone register 53), in response to receipt of such external sync acknowledgments, proceed to the external exchange phase.

The sync zone for which the external sync requests and external sync acknowledgments shown in FIG. 17 are exchanged may be sync zone Z3 that was discussed above with reference to FIGS. 15 and 16.

Figure 18:
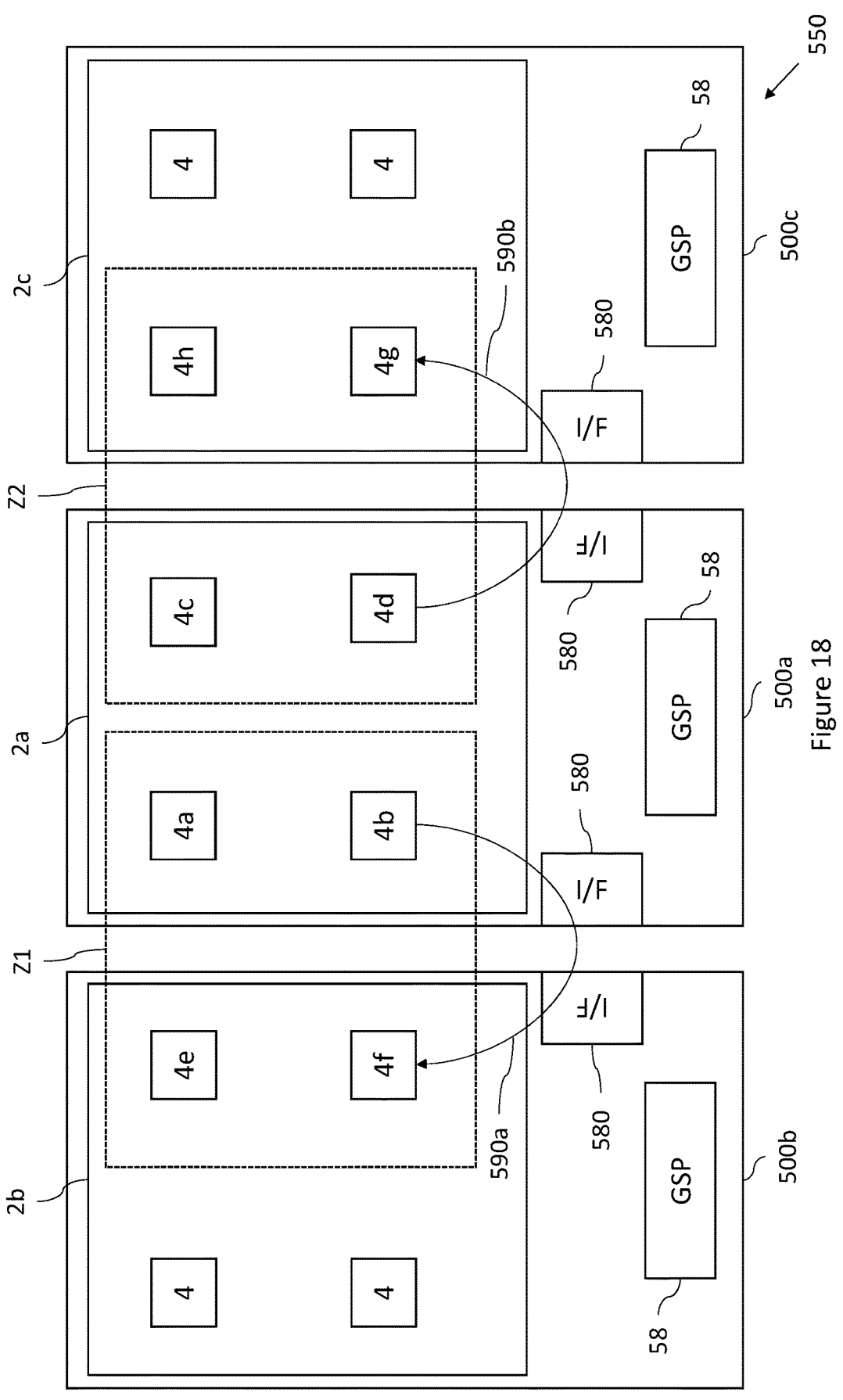
FIG. 18 is a schematic illustration of a system in which external sync zones are implemented.

Reference is made to FIG. 18, which illustrates how data exchange may be performed between different processing units 2 during external exchange phases for sync zones Z1 and Z2. In this example, sync zone Z1 that was discussed above with reference to FIGS. 15 and 16 comprises, in addition to tiles 4a and 4b, tiles 4e and 4f, which belong to processing unit 2b. The registers 53 of tiles 4e and 4f comprise indications that these tiles belong to sync zone Z1. Tiles 4a and 4b, when they reach the barrier synchronisation for Z1, each issue an external sync request toward the sync controller 55 of device 500a in the manner described above with respect to FIG. 15. In the same manner, tiles 4e and 4f when they reach the barrier synchronisation for Z1, each issue a tile sync request towards the sync controller 55 of device 500b. In response, these sync controllers 55 each forward an external sync request to the GSP 58 of their device 500a, 500b. In the manner described above with reference to FIG. 17, the GSPs 58 of the devices 500a, 500b exchange an external sync request and an external sync acknowledgement and then cause internal sync acknowledgments to be sent (via the sync controller 55 of their device 500a,b) to the tiles 4a,b,e,f of the device 500a, 500b to which they belong. Data exchange then takes place between one or more of tiles 4a,b and one or more of tiles 4e,f via interfaces 580 between the devices 500a,b. In FIG. 18, an example of the data exchange is shown, with tile 4b sending data 590a to tile 4f.

Also shown in this example of FIG. 18, are tiles 4 belonging to sync zone Z2, which was discussed above with reference to FIGS. 15 and 16. As shown, sync zone Z2 comprises in addition to tiles 4c and 4d, which were discussed above with respect to FIG. 15, tiles 4h and 4g, which belong to processing unit 2c. The registers 53 of tiles 4c and 4d comprise indications that these tiles belong to sync zone Z2. Tiles 4c and 4d, when they reach the barrier synchronisation for Z2, each issue a tile sync request towards the sync controller 55 of device 500a in the manner described above with respect to FIG. 15. In the same manner, tiles 4h and 4g when they reach the barrier synchronisation for Z2, each issue a tile sync request towards the sync controller 55 of device 500c. In response, each of these sync controllers 55 forwards external sync requests to the GSPs 58 of their devices 500a, 500c. In the manner described above with reference to FIG. 17, the GSPs 58 of devices 500a, 500c exchange an external sync request and an external sync acknowledgement and then cause internal sync acknowledgments to be sent (via the sync controller 55 of their device 500a,b) to the tiles 4c,d,h,g of the device 500a, 500c to which they belong. Data exchange then takes place between one or more of tiles 4c,d and one or more of tiles 4h,g via interfaces 580 between the devices 500a,c. In the example of FIG. 18, tile 4d is shown as sending data 590b to tile 4g.

Reference is made to FIG. 20, which illustrates a method 2000 for co-ordinating synchronisations between the processors 4 based on configurable sync groups (i.e. the sync zones discussed above). The method is performed on a single device 500.

At S2010, for each processor 4, the indications as to which sync zones, the respective processor 4 belongs are stored in the register 53 of the processor. Each of the processors 4 stores in its register 53, an indication for each of the sync zones, whether or not that processor 4 belongs to the respective sync zone.

At S2020, each of the processors 4 executes instructions held in its memory 51. S2020 may be performed at the same time as other steps in method 2000 are being performed.

At S2030, the sync controller 55 of the device 500 receives sync requests from the processors 4, and in response, returns sync acknowledgments. The sync requests are received at the sync controller 55 in the form of aggregated (or internal) sync requests that result from the individual tile sync requests. These tile sync requests include the requests issued at S2040 and S2050. Hence, S2030 is not complete when S2040 and S2050 are performed.

At S2040, a first of the processors 4, which does not belong to a first sync zone, issues a sync request for the first sync zone. The first of the processors 4 asserts the request in response to the indication in the register 53 of the first of the processors 4 that the first of the processors 4 does not belong the first sync zone. The first of the processors 4 at which S2040 is performed may, for example, be the tile 4c shown in FIG. 15, with the first sync zone being Z1.

After S2040, the sync controller 55 may, once all of the processors have asserted a sync request for Z1, return acknowledgments to all of the processors 4 in the device 500.

At S2050, a first of the processors 4, which does belong to a second sync zone, issues a sync request for the second sync zone. The first of the processors 4 asserts the request in response to the execution unit 52 reaching a synchronisation point (e.g. barrier) for the second sync zone in its code in memory 51. When it reaches this synchronisation point, the execution unit 52 executes a SYNC instruction to cause the sync request to be asserted. The second of the processors 4 at which S2040 is performed may, for example, be the tile 4c shown in FIG. 15, with the second sync zone being Z2.

After S2050, the sync controller 55 may, once all of the processors have asserted a sync request for the second sync zone, return acknowledgments to all of the processors 4 in the device 500.

Figure 21:
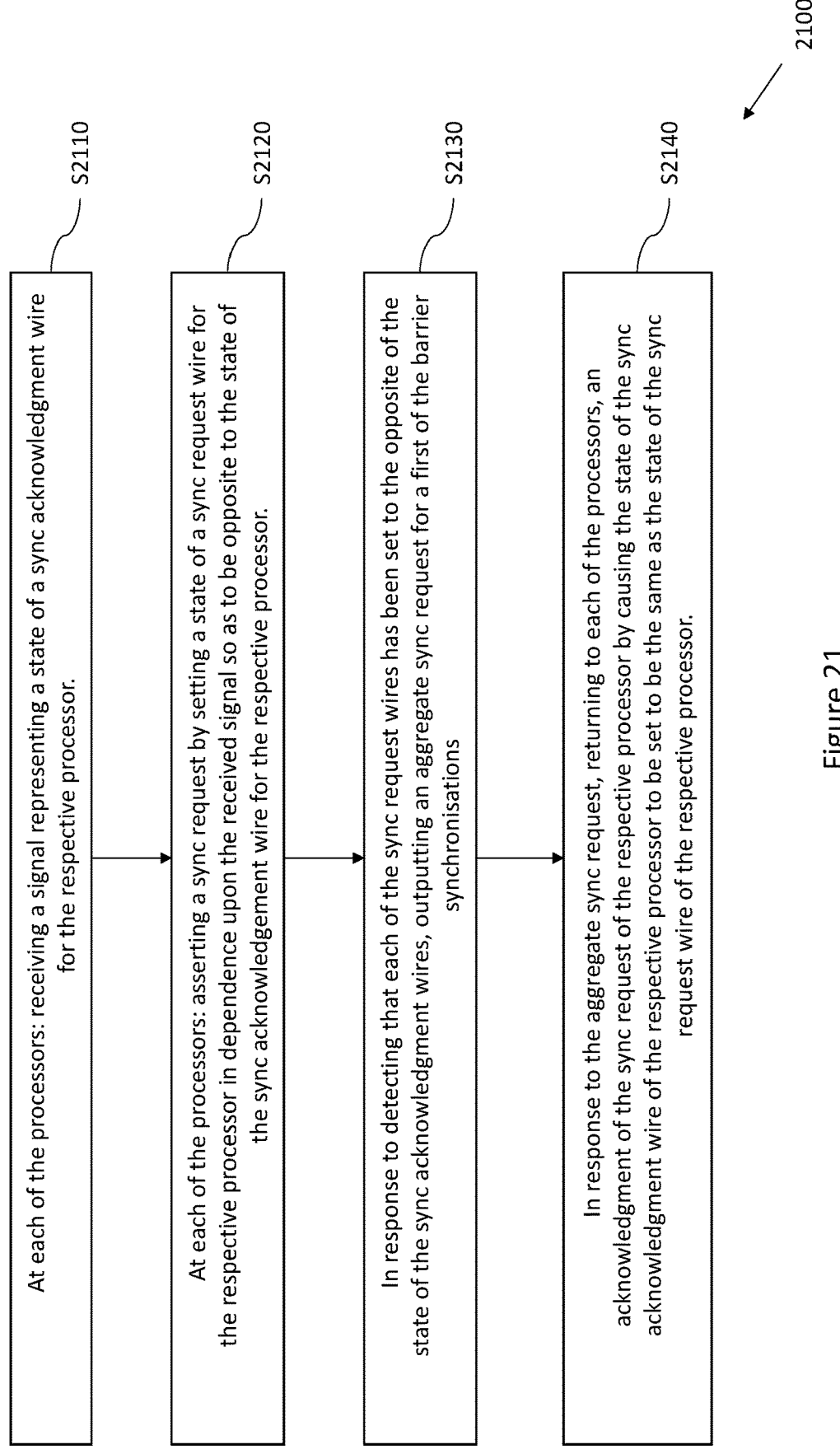

Reference is made to FIG. 21, which illustrates a method 2100 for co-ordinating synchronisations using a new scheme for signalling sync requests and acknowledgments. The method 2100 is performed by a single device 500.

At S2110, each of the processors 4, receives a signal representing a state of a sync acknowledgment wire for the respective processor 4. Each such sync acknowledgment wire on which the signal is received at S2110 is associated with the same sync zone. Each such signal received at each of the processors represents the same state (i.e. either high or low).

At S2120, each of the processors 4, asserts a sync request by setting the state of the sync request wire for the respective processor in dependence upon the received signal so as to be the opposite to the state of the sync acknowledgment wire for the respective processor 4.

At S2130, the aggregation circuitry 920, 910, in response to detecting that each of the sync request wires has been set to the opposite of the state of the sync acknowledgment wires, outputs an aggregate sync request (i.e. an internal sync request) for a first of the barrier synchronisations to the sync controller 55.

At S2140, in response to the aggregate sync request, the sync controller 55 returns a sync acknowledgment to each of the processors 4. This is achieved for each processor 4, by causing the state of the sync acknowledgment wire of the respective processor 4 to be set to be the same as the state of the sync request wire of the respective processor 4.

It would be appreciated that the above embodiments have been described by way of example only. In particular, it would be appreciated that although examples have been described in which the synchronisation points are BSP barrier synchronisations, in other embodiments, the synchronisation points may be different types of synchronisation points.

The invention claimed is:

1. A data processing device comprising:

a plurality of processors; and a sync controller comprising circuitry configured to receive requests from the plurality of processors to participate in synchronisations and, in response to receiving the requests, return acknowledgments to the processors, wherein each of the plurality of processors comprises:

an execution unit configured to execute a set of computer readable instructions held in memory of the respective processor; and a register storing, for each of a set of configurable sync groups, an indication as to whether or not the respective processor belongs to the respective configurable sync group, wherein for a first processor of the plurality of processors:

a first indication for a first configurable sync group of the set of configurable sync groups indicates that the first processor of the plurality of processors does not belong to the first configurable sync group of the set of configurable sync groups; and a second indication for a second configurable sync group of the se of configurable sync groups indicates that the first processor of the plurality of processors does belong to the second configurable sync group of the set of configurable sync groups, wherein the first processor of the plurality of processors comprises circuitry configured to, in response to the first indication for the first configurable sync group of the set of configurable sync groups indicating that the first processor of the plurality of processors does not belong to the first configurable sync group of the set of configurable sync groups, assert a first request to the sync controller to participate in a synchronisation for the first configurable sync group of the set of configurable sync groups, wherein the circuitry of the first processor of the plurality of processors is configured to, in response to the execution unit of the first processor of the plurality of processors reaching a synchronisation point for the second configurable sync group of the set of configurable sync groups indicated in the set of computer readable instructions for the first processor of the plurality of processors, assert a second request to the sync controller to participate in a synchronisation for the second configurable sync group of the set of configurable sync groups, further comprising aggregation circuitry configured to:

in response to each of the plurality of processors providing the first request to participate in the synchronisation for the first configurable sync group, provide a first aggregate sync request to the sync controller; and in response to each of the plurality of processors providing the second request to participate in the synchronisation for the second configurable sync group, provide a second aggregate sync request to the sync controller, wherein the circuitry of the sync controller is configured to return acknowledgments to the plurality of processors in response to each of the first aggregate sync request and the second aggregate sync request.

2. The data processing device of claim 1, wherein the circuitry of the sync controller is configured to, in response to each of the plurality of processors of the data processing device issuing the first request to participate in the synchronisation for the first configurable sync group of the set of configurable sync groups, issuing a corresponding acknowledgment to each of the plurality of processors.

3. The data processing device of claim 2, wherein the circuitry of the sync controller is configured to:

in response to the first requests to participate in the synchronisation for the first configurable sync group of the set of configurable sync groups, issue a further request to an external sync controller for the plurality of processors to synchronise with further processors belonging to further devices external to the data processing device; and subsequently, in response to receipt of a further acknowledgment of the further request from the external sync controller, return to each of the plurality of processors, the corresponding acknowledgment to each of the plurality of processors.

4. The data processing device of claim 3, comprising the external sync controller, wherein the external sync controller comprises:

storage storing a set of configuration settings for the first configurable sync group of the set of configurable sync groups; and circuitry configured to:

in response to the further request received from the sync controller, exchange one or more additional requests and one or more additional acknowledgments with the further processors belonging to further devices in dependence upon the configuration settings for the first configurable sync group of the set of configurable sync groups.

5. The data processing device of claim 1, wherein for each of the processors belonging to the first configurable sync group of the set of configurable sync groups, the execution unit of the respective processor is configured to, upon reaching a first barrier synchronisation enforced between the processors belonging to the first configurable sync group of the set of configurable sync groups, issue the first request to participate in the synchronisation for the first configurable sync group of the set of configurable sync groups, wherein for the first processor of the plurality of processors, the respective execution unit is configured to, whilst the execution units of each of the processors belonging to the first configurable sync group of the set of configurable sync groups are paused waiting at the first barrier synchronisation, proceed with computation or data exchange without waiting at the first barrier synchronisation.

6. The data processing device of claim 5, wherein the synchronisation for the second configurable sync group of the set of configurable sync groups is a second barrier synchronisation, wherein the execution unit of the first processor of the plurality of processors is configured to:

in response to receipt of an acknowledgment to the second request to participate in the synchronisation for the second configurable sync group of the set of configurable sync groups, proceed past the second barrier synchronisation.

7. The data processing device of claim 6, wherein the execution unit of the first processor of the plurality of processors is configured to: proceed past the second barrier synchronisation by entering an exchange phase in which the first processor of the plurality of processors at least one of: sends or receives data.

8. The data processing device of claim 1, wherein the execution unit of the first processor of the plurality of processors is configured to, following assertion of the first request to participate in the synchronisation for the first configurable sync of the set of configurable sync groups, execute an update instruction to update the first indication for the first configurable sync group of the set of configurable sync groups to specify that the first processor of the plurality of processors does belong to the first configurable sync group of the set of configurable sync groups.

9. The data processing device of claim 1, wherein the execution unit of the first processor of the plurality of processors is configured to, following assertion of the second request to participate in the synchronisation for the second configurable sync group of the set of configurable sync groups, execute an update instruction to update the second indication for the second configurable sync group of the set of configurable sync groups to specify that the first processor of the plurality of processors does not belong to the second configurable sync group of the set of configurable sync groups.

10. The data processing device of claim 1, comprising:

a first sync request wire connected to the first processor of the plurality of processors; and a second sync request wire connected to the first processor of the plurality of processors, wherein the circuitry of the first processor of the plurality of processors is configured to, assert the first request to participate in the synchronisation for the first configurable sync group of the set of configurable sync groups by asserting a signal on the first sync request wire, wherein the circuitry of the second processor of the plurality of processors is configured to, assert the second request to participate in the synchronisation for the second configurable sync group of the set of configurable sync groups by asserting a signal on the second sync request wire.

11. The data processing device of claim 1, wherein the circuitry of the first processor of the plurality of processors comprises a first multiplexer configured to, in dependence upon the first indication that the first processor of the plurality of processors does not belong to the first configurable sync group of the set of configurable sync groups, select a first input so as to output a first signal representative of the first request to participate in the synchronisation for the first configurable sync group of the set of configurable sync groups.

12. The data processing device of claim 1, wherein the circuitry of the first processor of the plurality of processors comprises a second multiplexer configured to, in dependence upon the second indication that the first processor of the plurality of processors does belong to the second configurable sync group of the set of configurable sync groups, select a second input so as to output a second signal controlled by the execution unit.

13. The data processing device of claim 12, wherein the execution unit of the first processor of the plurality of processors is configured to, upon reaching the synchronisation point, execute a sync instruction to cause the second signal to be set to a state so as to represent the second request to participate in the synchronisation for the second configurable sync group of the set of configurable sync groups.

14. The data processing device of claim 1, wherein the second configurable sync group of the set of configurable sync groups comprises further processors belonging to one or more further data processing devices external to the data processing device, wherein the first processor of the plurality of processors is configured to participate in the synchronisation for the second configurable sync group of the set of configurable sync groups by exchanging data with one or more of the further processors.

15. The data processing device of claim 1, wherein the execution unit of the first processor of the plurality of processors is configured to, upon reaching the synchronisation point for the second configurable sync group of the set of configurable sync groups, execute a sync instruction to cause the assertion of the second request to participate in the synchronisation for the second configurable sync group of the set of configurable sync groups.

16. The data processing device of claim 1, wherein the circuitry of the first processor of the plurality of processors is configured to:

receive from the execution unit of the first processor of the plurality of processors, a control signal indicating that the execution unit has reached the synchronisation point; and convert the control signal to the second request to participate in the synchronisation for the second configurable sync group of the set of configurable sync groups.

17. The data processing device of claim 1, wherein the first processor of the plurality of processors comprises a first interface configured to receive a first acknowledgment signal for the first configurable sync group of the set of configurable sync groups, wherein the circuitry of the first processor of the plurality of processors is configured to invert the first acknowledgment signal to produce the first request to participate in the synchronisation for the first configurable sync group of the set of configurable sync groups, wherein the first processor of the plurality of processors comprises a second interface configured to receive a second acknowledgment signal for the second configurable sync group of the set of configurable sync groups, wherein the circuitry of the second processor of the plurality of processors is configured to invert the second acknowledgment signal to produce the second request to participate in the synchronisation for the second configurable sync group of the set of configurable sync groups.

18. The data processing device of claim 1, wherein the data processing device is an integrated circuit.

19. A method implemented in a data processing device comprising a plurality of processors, the method comprising:

storing a first indication in a memory of a first processor of the plurality of processors, the first indication indicating that the first processor does not belong to a first configurable sync group; and storing a second indication in the memory of the first processor, the second indication indicating that the first processor does belong to a second configurable sync group, wherein the method comprises:

at a sync controller, receiving requests from the plurality of processors to participate in synchronisations and, in response to receiving the requests, returning acknowledgments to the plurality of processors;

at the first processor, in response to the first indication, asserting a first request to the sync controller to participate in a synchronisation for the first configurable sync group; and in response to an execution unit of the first processor reaching a synchronisation point for the second configurable sync group, asserting a second request to the sync controller to participate in a synchronisation for the second configurable sync group;

a second processor of the plurality of processors issuing a further request to participate in the synchronisation for the first configurable sync group upon reaching a first barrier synchronisation enforced between a subset of the plurality of processors, the subset of the plurality of processors belonging to the first configurable sync group; and the first processor proceeding with computation or data exchange without waiting at the first barrier synchronisation, whilst the second processor is paused waiting at the first barrier synchronisation.

20. The method of claim 19, further comprising, in response to all processors of the plurality of processors issuing the first requests to participate in the synchronisation for the first configurable sync group, issuing a corresponding acknowledgment for the first configurable sync group to each of the plurality of processors.

21. The method of claim 20, further comprising:

in response to the first requests from each of the plurality of processors of the plurality of processors to participate in the synchronisation for the first configurable sync group, issuing a further request from the sync controller to an external sync controller for the plurality of processors to synchronise with further processors belonging to further devices, wherein the issuing the corresponding acknowledgments for the first configurable sync group to each of the plurality of processors is performed in response to receipt of a further acknowledgment from the external sync controller.

22. The method of claim 19, wherein the synchronisation for the second configurable sync group is a second barrier synchronisation, the method further comprising:

the first processor proceeding past the second barrier synchronisation, by entering an exchange phase in response to receipt of an acknowledgment to the second request to participate in the synchronisation for the second configurable sync group.

23. The method of claim 19, further comprising:

following assertion of the first request to participate in the synchronisation for the first configurable sync group, executing an update instruction to update the first indication to specify that the first processor does belong to the first configurable sync group.

24. The method of claim 19, further comprising:

following assertion of the second request to participate in the synchronisation for the second configurable sync group, executing an update instruction to update the second indication to specify that the first processor does not belong to the second configurable sync group.

25. An integrated circuit comprising:

a plurality of processors; and a sync controller comprising circuitry configured to coordinate synchronisations among the processors, wherein a first processor of the plurality of processors comprises:

an execution unit configured to execute a set of computer readable instructions held in memory of the first processor; and a register storing a first indication indicating that the first processor does not belong to a first configurable sync group and a second indication indicating that the first processor does belong to a second configurable sync group, wherein the first processor of the plurality of processors comprises circuitry configured to, in response to the first indication, assert a first request to the sync controller to participate in a synchronisation for the first configurable sync group, wherein the circuitry of the first processor of the plurality of processors is configured to, in response to the first processor reaching a synchronisation point for the second configurable sync group, assert a second request to the sync controller to participate in a synchronisation for the second configurable sync group;

wherein the circuitry of the first processor of the plurality of processors is configured to:

receive from the execution unit of the first processor of the plurality of processors, a control signal indicating that the execution unit has reached the synchronisation point for the second configurable sync group; and convert the control signal to the second request to participate in the synchronisation for the second configurable sync group.

\* \* \* \* \*